US012375022B2

(12) United States Patent
Gaspar et al.

(10) Patent No.: US 12,375,022 B2
(45) Date of Patent: Jul. 29, 2025

(54) POWER TOOL INCLUDING CURRENT-BASED FIELD WEAKENING

(71) Applicant: MILWAUKEE ELECTRIC TOOL CORPORATION, Brookfield, WI (US)

(72) Inventors: Austin Gaspar, Maple Valley, WA (US); Gerald M. Nagel, Sussex, WI (US); Shuvam Gupta, Wauwatosa, WI (US); Alexander T. Huber, Menomonee Falls, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 194 days.

(21) Appl. No.: 18/356,026

(22) Filed: Jul. 20, 2023

(65) Prior Publication Data

US 2024/0048085 A1    Feb. 8, 2024

Related U.S. Application Data

(60) Provisional application No. 63/370,405, filed on Aug. 4, 2022.

(51) Int. Cl.
*H02P 29/40* (2016.01)
*B25F 5/02* (2006.01)
*H02P 7/29* (2016.01)

(52) U.S. Cl.
CPC ............... *H02P 29/40* (2016.02); *B25F 5/02* (2013.01); *H02P 7/29* (2013.01)

(58) Field of Classification Search
CPC .. H02P 29/40; H02P 7/29; H02P 23/30; H02P 21/22; H02P 6/28; B25F 5/02;
(Continued)

(56) References Cited

U.S. PATENT DOCUMENTS

| 5,804,939 A | 9/1998 | Yamai et al. |
| 6,605,912 B1 | 8/2003 | Bharadwaj et al. |

(Continued)

FOREIGN PATENT DOCUMENTS

| CN | 204913826 U | 12/2015 |
| CN | 113676097 A | 11/2021 |

(Continued)

OTHER PUBLICATIONS

Japanese Patent Office Action for Application No. 2023-124082 dated Oct. 15, 2024 (18 pages including machine English translation).

(Continued)

*Primary Examiner* — David Luo
(74) *Attorney, Agent, or Firm* — Michael Best & Friedrich LLP

(57) ABSTRACT

A power tool that includes a brushless motor, a power switching circuit, a current sensor, and an electronic controller. The power switching circuit provides a supply of power to the brushless motor. The current sensor is configured to sense a current of the brushless motor. The electronic controller is configured to receive a first signal indicative of current of the brushless motor, generate a current command, set a conduction angle of the brushless motor based on the current command, supply a PWM signal having a duty cycle to the brushless motor to increase current of the brushless motor, determine whether duty cycle equals a first threshold, maintain the duty cycle at the first threshold, modify the conduction angle to increase the current of the brushless DC motor, determine whether current equals a second threshold, and control the second conduction angle to maintain current at the second threshold.

20 Claims, 33 Drawing Sheets

(58) Field of Classification Search
CPC ....... B25F 5/00; H02K 11/0094; H02K 11/27; H02K 11/30
USPC ...................................................... 318/17, 3
See application file for complete search history.

(56) References Cited

U.S. PATENT DOCUMENTS

| | | |
|---|---|---|
| 6,995,679 B2 | 2/2006 | Eskritt et al. |
| 7,170,243 B2 | 1/2007 | Nakagawa et al. |
| 7,180,256 B2 | 2/2007 | Eskritt et al. |
| 7,202,622 B2 | 4/2007 | Eskritt et al. |
| 7,270,910 B2 | 9/2007 | Yahnker et al. |
| 7,508,171 B2 | 3/2009 | Carrier et al. |
| 7,602,146 B2 | 10/2009 | Carrier et al. |
| 7,719,234 B2 | 5/2010 | Carrier et al. |
| 7,821,217 B2 | 10/2010 | Abolhassani et al. |
| 8,212,504 B2 | 7/2012 | Ogahara |
| 8,446,120 B2 | 5/2013 | Forster et al. |
| 8,653,787 B2 | 2/2014 | Cunanan et al. |
| 8,796,995 B2 | 8/2014 | Cunanan et al. |
| 8,931,576 B2 | 1/2015 | Iwata |
| 8,988,015 B2 | 3/2015 | Forster et al. |
| 9,000,882 B2 | 4/2015 | Velderman et al. |
| 9,071,069 B2 | 6/2015 | Brotto et al. |
| 9,209,642 B2 | 12/2015 | Cunanan et al. |
| 9,225,275 B2 | 12/2015 | Sterling et al. |
| 9,314,900 B2 | 4/2016 | Vanko et al. |
| 9,401,250 B2 | 7/2016 | Velderman et al. |
| 9,406,457 B2 | 8/2016 | Velderman et al. |
| 9,406,915 B2 | 8/2016 | White et al. |
| 9,413,088 B2 | 8/2016 | Brotto et al. |
| 9,444,269 B2 | 9/2016 | Wohltmann et al. |
| 9,461,379 B2 | 10/2016 | Cunanan et al. |
| 9,508,498 B2 | 11/2016 | Forster et al. |
| 9,570,822 B2 | 2/2017 | Cunanan et al. |
| 9,583,745 B2 | 2/2017 | White et al. |
| 9,583,793 B2 | 2/2017 | White et al. |
| 9,692,157 B2 | 6/2017 | Brotto et al. |
| 9,722,334 B2 | 8/2017 | Sterling et al. |
| 9,762,153 B2 | 9/2017 | Forster et al. |
| 9,871,484 B2 | 1/2018 | White et al. |
| 9,893,384 B2 | 2/2018 | Velderman et al. |
| 9,960,509 B2 | 5/2018 | Sterling et al. |
| 9,966,774 B2 | 5/2018 | Wohltmann et al. |
| 10,027,140 B2 | 7/2018 | Cunanan et al. |
| 10,050,572 B2 | 8/2018 | Pant et al. |
| 10,056,582 B2 | 8/2018 | White et al. |
| 10,177,701 B2 | 1/2019 | White et al. |
| 10,193,111 B2 | 1/2019 | Varipatis et al. |
| 10,236,819 B2 | 3/2019 | White et al. |
| 10,243,491 B2 | 3/2019 | Cox et al. |
| 10,250,178 B2 | 4/2019 | White et al. |
| 10,256,697 B2 | 4/2019 | Velderman et al. |
| 10,291,173 B2 | 5/2019 | Cox et al. |
| 10,322,498 B2 | 6/2019 | Ishikawa et al. |
| 10,333,453 B2 | 6/2019 | Forster et al. |
| 10,333,454 B2 | 6/2019 | Forster et al. |
| 10,361,651 B2 | 7/2019 | White et al. |
| 10,411,558 B2 | 9/2019 | Forster et al. |
| 10,469,006 B2 | 11/2019 | Pant et al. |
| 10,541,639 B2 | 1/2020 | White et al. |
| 10,608,574 B2 | 3/2020 | White et al. |
| 10,615,733 B2 | 4/2020 | Cox et al. |
| 10,651,706 B2 | 5/2020 | Forster et al. |
| 10,658,903 B2 | 5/2020 | Forster et al. |
| 10,666,068 B2 | 5/2020 | Cunanan et al. |
| 10,686,319 B2 | 6/2020 | Wohltmann et al. |
| 10,710,220 B2 | 7/2020 | Manasseh et al. |
| 10,840,559 B2 | 11/2020 | Velderman et al. |
| 10,965,229 B2 | 3/2021 | Pant |
| 10,972,041 B2 | 4/2021 | White et al. |
| 10,978,746 B2 | 4/2021 | Velderman et al. |
| 11,005,399 B2 | 5/2021 | Pant |
| 11,005,411 B2 | 5/2021 | White et al. |
| 11,005,412 B2 | 5/2021 | White et al. |
| 11,063,548 B2 | 7/2021 | Cox et al. |
| 11,070,162 B2 | 7/2021 | Cox et al. |
| 11,095,239 B2 | 8/2021 | Delose et al. |
| 11,133,772 B2 | 9/2021 | White et al. |
| 11,152,886 B2 | 10/2021 | White et al. |
| 11,171,542 B2 | 11/2021 | Vanko et al. |
| 11,258,389 B2 * | 2/2022 | Xu .............................. B25F 5/02 |
| 11,329,597 B2 | 5/2022 | Vanko et al. |
| 2005/0073282 A1 | 4/2005 | Carrier et al. |
| 2007/0152624 A1 | 7/2007 | Hamaoka et al. |
| 2008/0003491 A1 | 1/2008 | Yahnker et al. |
| 2009/0146614 A1 | 6/2009 | Carrier et al. |
| 2011/0037423 A1 | 2/2011 | Koda et al. |
| 2014/0232326 A1 | 8/2014 | Wohltmann et al. |
| 2017/0126051 A1 | 5/2017 | Cox et al. |
| 2017/0246732 A1 | 8/2017 | Dey, IV et al. |
| 2017/0338753 A1 | 11/2017 | Forster et al. |
| 2018/0090979 A1 | 3/2018 | Forster et al. |
| 2019/0318616 A1 | 10/2019 | Matson et al. |
| 2019/0341872 A1 | 11/2019 | Cox et al. |
| 2020/0228046 A1 | 7/2020 | White et al. |
| 2020/0235638 A1 | 7/2020 | Velderman |
| 2020/0295579 A1 | 9/2020 | Wohltmann et al. |
| 2020/0335834 A1 | 10/2020 | Velderman et al. |
| 2020/0389108 A1 | 12/2020 | Yajurvedi et al. |
| 2020/0389109 A1 | 12/2020 | Yajurvedi et al. |
| 2020/0389110 A1 | 12/2020 | Yajurvedi et al. |
| 2020/0412294 A1 | 12/2020 | Cox |
| 2022/0060085 A1 | 2/2022 | Vanko et al. |
| 2022/0193868 A1 | 6/2022 | Friedman et al. |
| 2022/0216746 A1 | 7/2022 | Yoneda et al. |

FOREIGN PATENT DOCUMENTS

| | | |
|---|---|---|
| CN | 109842330 B | 12/2021 |
| JP | 2005176529 A | 6/2005 |
| JP | 2008154431 A | 7/2008 |
| JP | 2011254600 A | 12/2011 |
| JP | 2016093854 A | 5/2016 |
| WO | 2005025050 A1 | 3/2005 |
| WO | 2015129904 A1 | 9/2015 |
| WO | 2017122592 A1 | 7/2017 |
| WO | 2020093465 A1 | 5/2020 |
| WO | 2020217626 A1 | 10/2020 |
| WO | 2021002120 A1 | 1/2021 |
| WO | 2021057340 A1 | 4/2021 |
| WO | 2021100843 A1 | 5/2021 |
| WO | 2022132892 A1 | 6/2022 |

OTHER PUBLICATIONS

Extended European Search Report for Application No. 23188761.3 dated Jan. 12, 2024 (9 pages).

* cited by examiner

TO FIG.15B

FROM FIG.15A

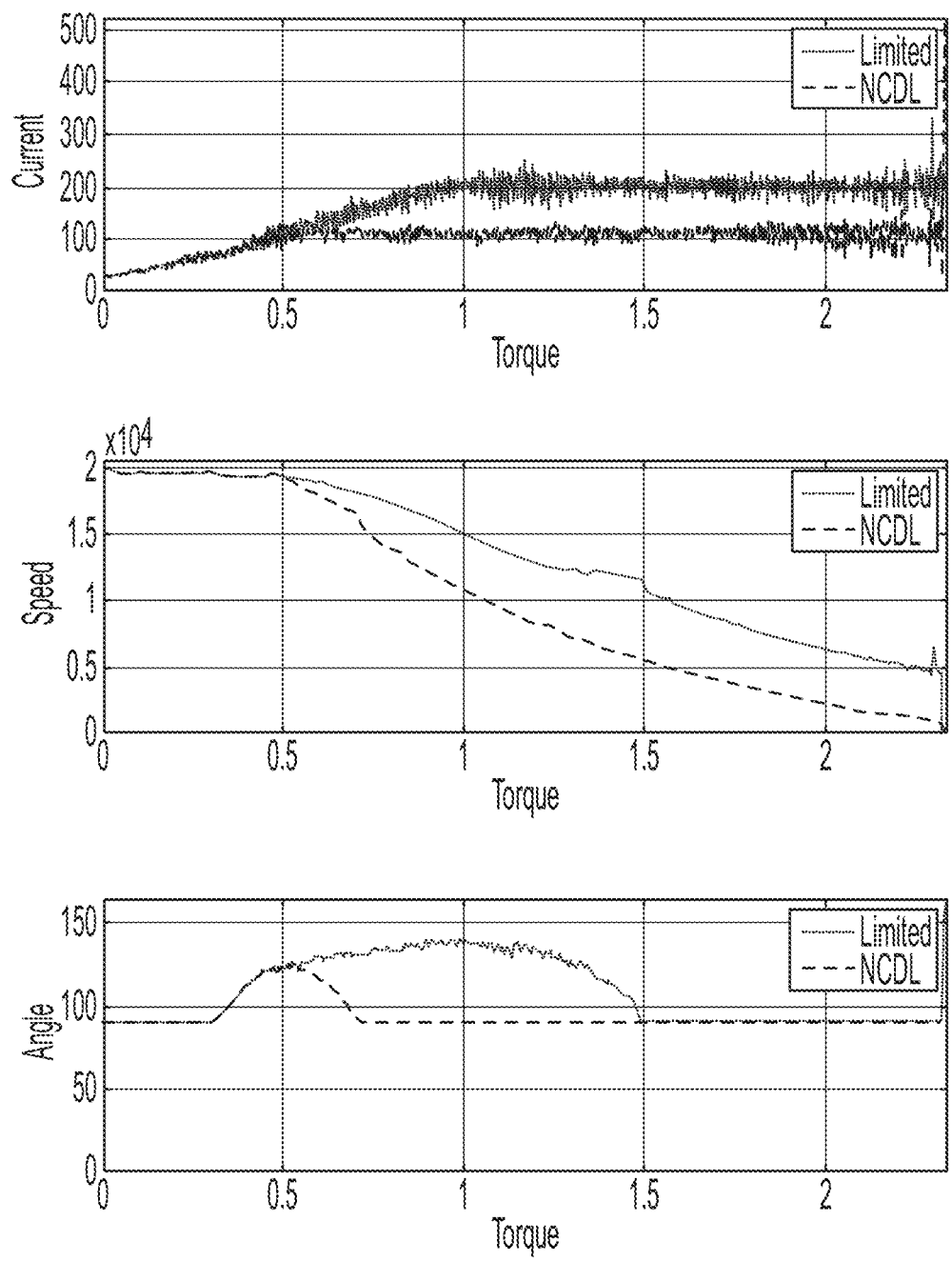
FIG. 16A
TO FIG.16B

POWER TOOL INCLUDING CURRENT-BASED FIELD WEAKENING

RELATED APPLICATIONS

This application claims the benefit of U.S. Provisional Patent Application No. 63/370,405, filed Aug. 4, 2022, the entire content of which is hereby incorporated by reference.

FIELD

Embodiments described herein relate to controlling power tools.

SUMMARY

Power tools described herein include a housing, a brushless direct current ("DC") motor, a power switching circuit, a current sensor, and an electronic controller. The brushless DC motor is located within the housing. The power switching circuit provides a supply of power from a battery pack to the brushless DC motor. The current sensor senses a current of the brushless DC motor. The electronic controller is connected to the brushless DC motor, the power switching circuit, and the current sensor. The electronic controller is configured to receive, via the current sensor, a first signal indicative of the current of the brushless DC motor, generate a current command based on a characteristic of the brushless DC motor, and set a conduction angle of the brushless DC motor based on the current command. The electronic controller is further configured to supply a pulse-width modulated ("PWM") signal having a duty cycle to the brushless DC motor to increase the current of the brushless DC motor, determine whether the duty cycle of the PWM signal is equal to a first threshold value, maintain, in response to the duty cycle being equal to the first threshold, the duty cycle at the first threshold, modify the conduction angle to increase the current of the brushless DC motor, determine whether the current command is equal to a second threshold, and control, in response to the current command being equal to the second threshold, the conduction angle to maintain the current command at the second threshold.

In some aspects, the electronic controller is further configured to determine whether the conduction angle is equal to a third threshold and maintain, in response to the conduction angle being equal to the third threshold, the conduction angle at the third threshold. The electronic controller is also configured to determine whether the conduction angle is equal to a fourth threshold and supply, in response to the conduction angle being equal to the fourth threshold, a second PWM signal having a second duty cycle to the brushless DC motor to control the current of the brushless DC motor.

In some aspects, the first threshold is a 100% duty cycle of the PWM signal.

In some aspects, to maintain the duty cycle at the first threshold, the electronic controller is further configured to control the PWM signal to stay at the 100% duty cycle.

In some aspects, the second threshold is a maximum current command.

In some aspects, the electronic controller is further configured to receive, from the current sensor, a current feedback signal and determine, based on the current feedback signal, a first variation in the PWM signal to apply to the brushless DC motor.

In some aspects, the electronic controller is further configured to determine, based on the current feedback signal, a second variation in the conduction angle to apply to the brushless DC motor.

Methods described herein provide for controlling a power tool including an electronic controller. The methods include receiving, via a current sensor, a first signal indicative of a current of a brushless DC motor, generating a current command based on a characteristic of the brushless DC motor, setting a conduction angle of the brushless DC motor based on the current command, and supplying a pulse-width modulated ("PWM") signal having a duty cycle to the brushless DC motor to control the current of the brushless DC motor. The methods also include determining whether the duty cycle of the PWM signal is equal to a first threshold, maintaining, in response to the duty cycle being equal to the first threshold, the duty cycle at the first threshold, modifying the conduction angle to increase the current of the brushless DC motor, determining whether the current command is equal to a second threshold, and controlling, in response to the current command being equal to the second threshold, the conduction angle to maintain the current command at the second threshold.

In some aspects, the methods described herein further include determining whether the conduction angle is equal to a third threshold, maintaining, in response to the conduction angle being equal to the third threshold, the conduction angle at the third threshold, determining whether the conduction angle is equal to a fourth threshold, and supplying, in response to the conduction angle being equal to the fourth threshold, a second PWM signal having a second duty cycle to the brushless DC motor to control the current of the brushless DC motor.

In some aspects, the first threshold is a 100% duty cycle of the PWM signal.

In some aspects, maintaining the duty cycle at the first threshold includes controlling the PWM signal to stay at the 100% duty cycle.

In some aspects, the second threshold is a maximum current command.

In some aspects, the methods described herein further include receiving, from the current sensor, a current feedback signal and determining, based on the current feedback signal, a first variation in the PWM signal to apply to the brushless DC motor.

In some aspects, the methods described herein further include determining, based on the current feedback signal, a second variation in the conduction angle to apply to the brushless DC motor.

Power tools described herein include a housing, a brushless direct current (DC) motor within the housing, a trigger, a power switching circuit that provides a supply of power from a battery pack to the brushless DC motor, a voltage sensor configured to sense a bus voltage, a current sensor configured to sense a current of the brushless DC motor, and an electronic controller connected to the trigger, the brushless DC motor, the voltage sensor, and the current sensor. The electronic controller is configured to provide, in response to actuation of the trigger, power to the brushless DC motor according to a first current limit value, receive, via the current sensor, a first signal indicative of the current of the brushless DC motor, receive, via the voltage sensor, a second signal indicative of a voltage of the power switching circuit, generate a current command based on a characteristic of the brushless DC motor, and set a conduction angle of the brushless DC motor based on the current command. The electronic controller is also configured to supply a pulse-width modulated ("PWM") signal having a duty cycle to the brushless DC motor to control the current of the brushless DC motor, determine whether the voltage of the power switching circuit is greater than or equal to a voltage threshold, determine whether the duty cycle of the PWM signal is equal to a first threshold, adjust, in response to the voltage of the power switching circuit being less than or equal to the voltage threshold, the first current limit value to a second current limit value, and maintain, in response to the duty cycle being equal to the first threshold, the duty cycle at the first threshold. The electronic controller is also configured to modify the conduction angle to increase the current of the brushless DC motor, determine whether the current command is equal to a second threshold, and control, in response to the current command being equal to the second threshold, the conduction angle to maintain the current at the second threshold.

In some aspects, the first current limit value is a permitted maximum current draw from the power switching circuit.

In some aspects, the second current limit value is less than the first current limit value.

In some aspects, the electronic controller is further configured to determine a speed of the brushless DC motor, determine, based on the speed of the brushless DC motor and a speed command signal, an electric current value to provide to the brushless DC motor, and provide the electric current value to drive the brushless DC motor.

In some aspects, the electronic controller is further configured to determine, in response to the voltage of the power switching circuit being greater than the voltage threshold, whether the electric current value is equal to the first current limit value and adjust, in response to the electric current value not being equal to the first current limit value, the first current limit value to a third current limit value.

In some aspects, the third current limit value is greater than the second current limit value.

Before any embodiments are explained in detail, it is to be understood that the embodiments are not limited in application to the details of the configurations and arrangements of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%) of an indicated value.

It should be understood that although certain drawings illustrate hardware and software located within particular devices, these depictions are for illustrative purposes only. Functionality described herein as being performed by one component may be performed by multiple components in a distributed manner Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Accordingly, in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

Other aspects of the embodiments will become apparent by consideration of the detailed description and accompanying drawings.

DETAILED DESCRIPTION

Embodiments described herein relate to a power tool that is configured to implement a current-based field weakening control to increase the speed and energy of an operation of the power tool. The current-based field weakening allows the power tool to produce more current and torque during operation without increasing voltage and pulse-width modulation of a control signal. The current-based field weakening increases current of the motor in the direction of voltage during operation to adjust the power received by the motor from a power source. For example, the current-based field weakening increases current of the motor by increasing the pulse-width modulation duty ratio of the control signal. When the pulse-width modulation is maximized, the current-based field weakening increases conduction angle. The field weakening algorithm can be accomplished using sensored motor control or sensorless motor control. The current-based field weakening implemented by the power tool during an operation of the power tool. The current-based field weakening optimizes the efficiency of the power tool by producing the highest available torque at the lowest possible current. The conduction angle in current-based field weakening converges automatically to a value without manual tuning, and self-adjusts for changes in a power source (e.g., a battery pack), an inverter, a motor, and other mechanical characteristics. The field weakening algorithm combines current limiting control with field weakening control to reduce processing requirements and power. In some field weakening techniques, such as field weakening techniques that use field-oriented control, significant processing power is required to implement similar current limiting and field weakening principles in order to achieve similar speed and efficiency of the motor. The current-based field weakening reduces processing requirements (e.g., compared to field-oriented control) while optimizing efficiency and increasing torque produced by the motor.

In some embodiments, the current-based field weakening includes power source voltage control. The field weakening algorithm controls the voltage of the power source to limit current and adjust the power supplied from the power source. In some embodiments, the field weakening algorithm is used to control the voltage supplied from gate drivers of the power source. The field weakening algorithm is implemented as a current limiter of the power source in which direct manipulation of the power source current allows for improved output torque control from the power tool motor and voltage control of the power source. The field weakening algorithm provides more power to overcome greater loading conditions.

Figure 1:
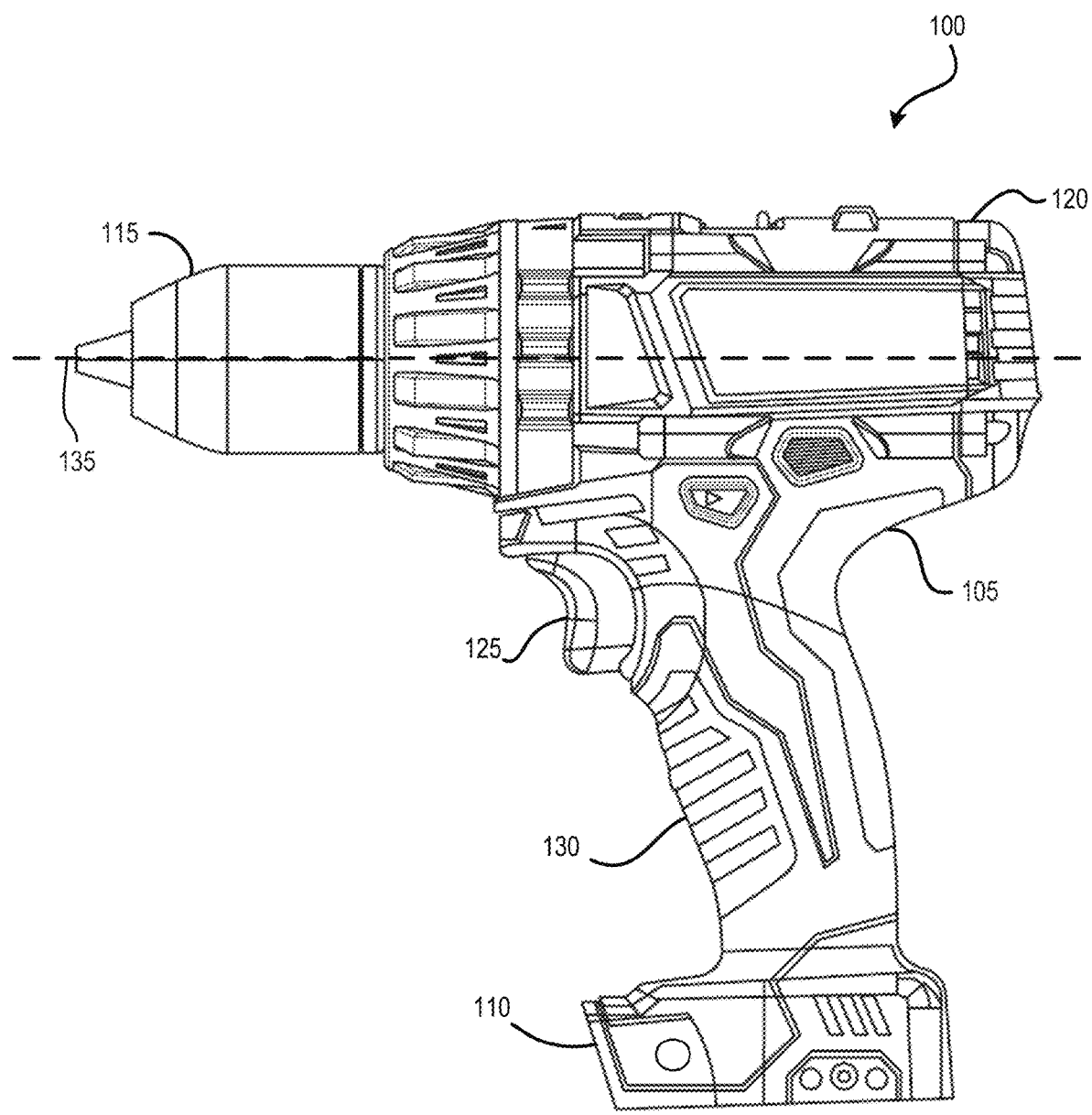
FIG. 1 illustrates a power tool, in accordance with embodiments described herein.

FIG. 1 illustrates an example power tool 100, according to some embodiments. The power tool 100 includes a housing 105, a power source interface 110, a driver 115 (e.g., a chuck or bit holder), a motor housing 120, a trigger 125, and a handle 130. The motor housing 120 houses a motor 215 (see FIG. 2). A longitudinal axis 135 extends from the driver 115 through a rear of the motor housing 120. During operation, the driver 115 rotates about the longitudinal axis 135. The longitudinal axis 135 may be approximately perpendicular with the handle 130. While FIG. 1 illustrates a specific power tool 100 with a rotational output, it is contemplated that the field weakening methods described herein may be used with multiple types of power tools, such as drills, drivers, powered screw drivers, powered ratchets, grinders, right angle drills, rotary hammers, pipe threaders, circular saws, table saws, or another type of power tool that experiences rotation about an axis. In some embodiments, the power tool 100 is a power tool that experiences translational movement, such as reciprocal saws, chainsaws, pole-saws, cut-off saws, die-grinders, etc. while embodiments described herein primarily refer to implementing field weakening in a power tool with a rotational output, in some embodiments, the field weakening algorithm is implemented in a power tool with a translational or other output.

Figure 2:
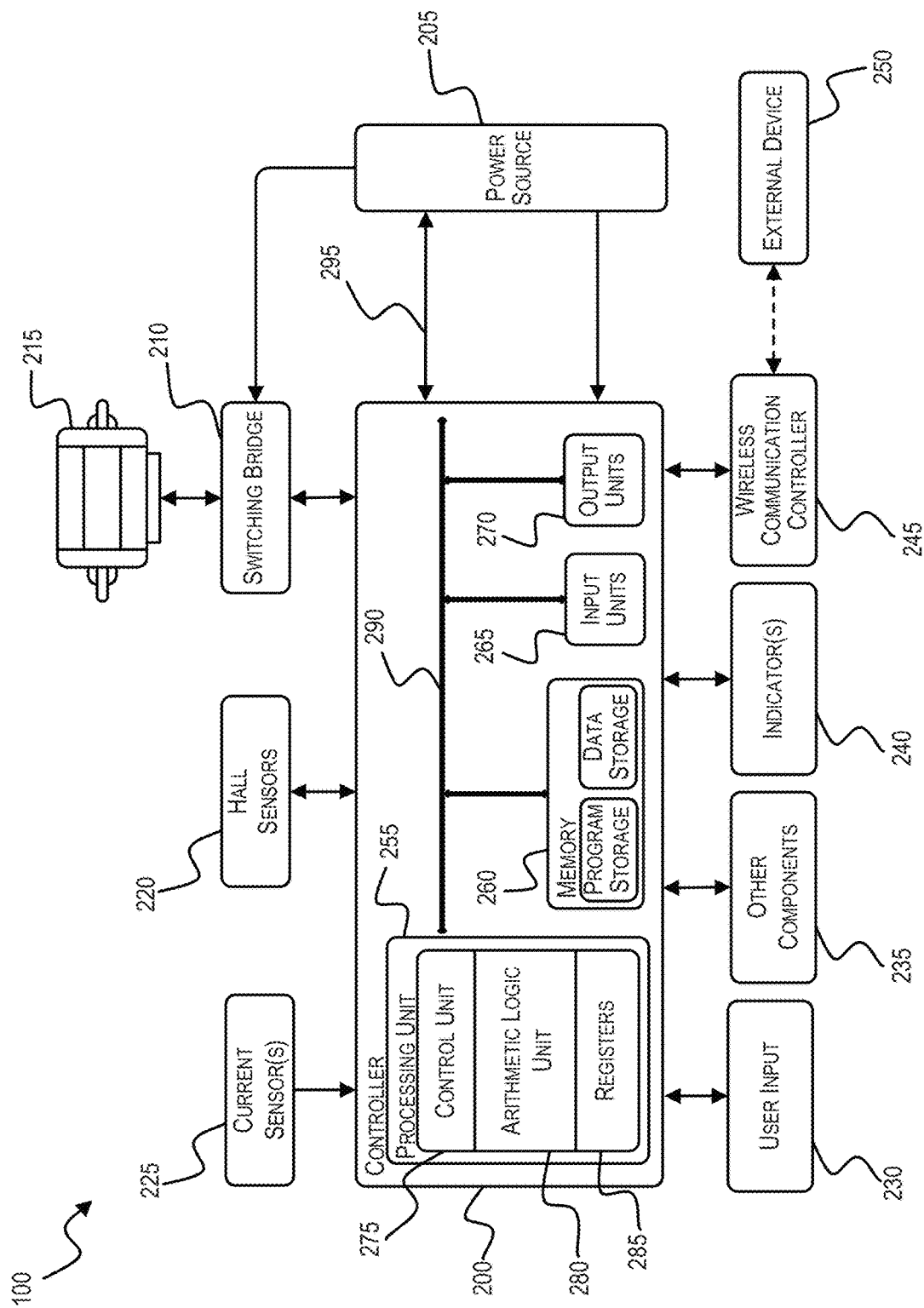
FIG. 2 is a block diagram of the power tool of FIG. 1, in accordance with embodiments described herein.

FIG. 2 illustrates an electromechanical diagram of the brushless power tool 100, which includes a controller 200.

The controller 200 is electrically and/or communicatively connected to a variety of modules or components of the power tool 100. For example, the illustrated controller 200 is connected to a power source 205, a switching bridge 210, the motor 215, Hall Effect sensors 220 (also referred to as Hall sensors), one or more current sensors 225, a user input 230 (e.g., the trigger 125), other components 235 (e.g., a battery pack fuel gauge, work lights [e.g., LEDs], current/voltage sensors, etc.), one or more indicators 240 (e.g., LEDs), and a wireless communication controller 245 (e.g., a transceiver) configured to communicate with an external device 250 (e.g., a smartphone, a tablet computer, a laptop computer, and the like). The wireless communication controller 245 and its communication with the external device 250 is described in greater detail in, for example, U.S. Patent Application Publication No. 2017/0246732, published on Aug. 31, 2017 and entitled "POWER TOOL INCLUDING AN OUTPUT POSITION SENSOR," the entire content of which is hereby incorporated by reference.

The controller 200 includes combinations of hardware and software that are operable to, among other things, control the operation of the power tool 100, control power provided to the motor 215, etc. In some embodiments, the controller 200 includes a plurality of electrical and electronic components that provide power, operational control, and protection to the components and modules within the controller 200 and/or power tool 100. For example, the controller 200 includes, among other things, a processing unit 255 (e.g., a microprocessor, a microcontroller, or another suitable programmable device), a memory 260, input units 265, and output units 270. The processing unit 255 includes, among other things, a control unit 275, an arithmetic logic unit ("ALU") 280, and a plurality of registers 285 (shown as a group of registers in FIG. 2), and is implemented using a known computer architecture (e.g., a modified Harvard architecture, a von Neumann architecture, etc.). The processing unit 255, the memory 260, the input units 265, and the output units 270, as well as the various modules connected to the controller 200 are connected by one or more control and/or data buses (e.g., common bus 290). The control and/or data buses are shown generally in FIG. 2 for illustrative purposes. The use of one or more control and/or data buses for the interconnection between and communication among the various modules and components would be known to a person skilled in the art in view of the embodiments described herein.

The memory 260 is a non-transitory computer readable medium that includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The processing unit 255 is connected to the memory 260 and executes software instructions that are capable of being stored in a RAM of the memory 260 (e.g., during execution), a ROM of the memory 260 (e.g., on a generally permanent basis), or another non-transitory computer readable medium such as another memory or a disc. Software included in the implementation of the power tool 100 can be stored in the memory 260 of the controller 200. The software includes, for example, firmware, one or more applications, program data, filters, rules, one or more program modules, and other executable instructions. The controller 200 is configured to retrieve from memory and execute, among other things, instructions related to the control of the power tool 100 described herein. In other constructions, the controller 200 includes additional, fewer, or different components.

The power source 205 provides DC power to the various components of the power tool 100. In some embodiments, the power source 205 is a power tool battery pack that is rechargeable and uses, for example, lithium ion battery cell technology. In other embodiments, the power source 205 may receive AC power (e.g., 120V/60 Hz) from a tool plug that is coupled to a standard wall outlet, and then filter, condition, and rectify the received power to output DC power. In some embodiments, the power tool 100 includes, for example, a communication line 295 for providing a communication line or link between the controller 200 and the power source 205.

Each of the Hall effect sensors 220 outputs motor feedback information, such as an indication (e.g., a pulse) related to when a magnet of the motor 215's rotor rotates across the face of that Hall effect sensor 220. Based on the motor feedback information from the Hall effect sensors 220, the controller 200 is able to determine the rotational position, speed, and acceleration of the rotor. The one or more current sensors 225 output information regarding the current supplied to the motor 215 and/or the power tool 100.

The power tool 100 is configured to operate in various modes. For example, the controller 200 receives user controls from user input 230, such as by depressing the trigger 125 or actuating any other user input 230 of the power tool 100. In response to the motor feedback information and user controls, the controller 200 generates control signals to control the switching bridge 210 (e.g., a FET switching bridge) to drive the motor 215. For example, the switching bridge 210 may include a plurality of high side switching elements (e.g., FETs) and a plurality of low side switching elements. By selectively enabling and disabling the switches of the switching bridge 210, power from the power source 205 is selectively applied to stator coils of the motor 215 to cause rotation of the motor 215's rotor. Although not shown explicitly, the one or more current sensors 225 and other components of the power tool 100 are electrically coupled to the power source 205 such that the power source 205 provides power to those components.

In some embodiments, controller 200 also controls other aspects of the power tool 100 such as, for example, recording usage data, communication with an external device, and the like. In some embodiments, the power tool 100 is configured to control the operation of the motor 215 based on the detected current supplied by the power source 205. For example, in some embodiments, the controller 200 is configured to monitor a current supplied by the power source 205 via the information output by the one or more current sensors 225. The controller 200 can then control the motor 215 based on the detected current supplied by the power source 205. By monitoring the motor 215 and the power source 205, the controller 200 can control the motor 215 at the highest efficiency while achieving the highest torque available at the lowest possible current over the entire range of input voltages (e.g., battery pack voltage) and motor speeds.

Figure 3:
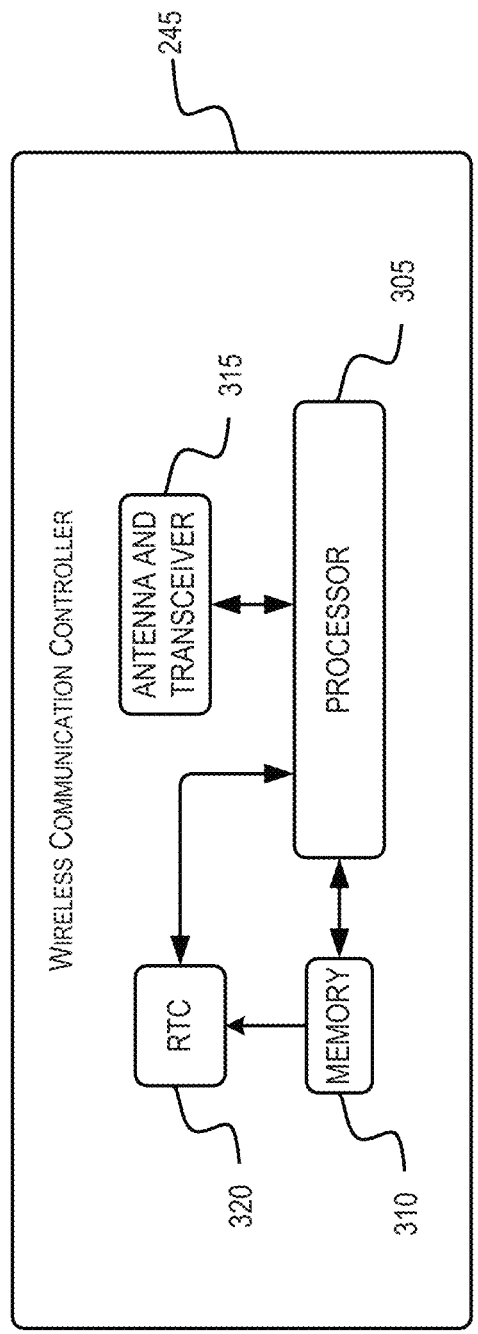
FIG. 3 illustrates a block diagram of a wireless communication controller, in accordance with embodiments described herein.

In some embodiments, any of the proposed power tool devices may include a wireless communication controller 245 coupled to their respective controllers for communicating over a wireless network. FIG. 3 illustrates an example wireless communication controller 245. As shown in FIG. 3, the wireless communication controller 245 includes a processor 305, a memory 310, an antenna and transceiver 315, and a real-time clock ("RTC") 320. The wireless communication controller 245 enables a power tool device to communicate with an external device 250 (see, e.g., FIGS. 2 and 4). The radio antenna and transceiver 315 operate together and send and receive wireless messages to and from the external device 250 and the processor 305. The memory 310 can store instructions to be implemented by the processor 305 and/or may store data related to communications between the power tool device and the external device 250. For example, the processor 305 associated with the wireless communication controller 245 buffers incoming and/or outgoing data, communicates with the controller 200, and determines the communication protocol and/or settings to use in wireless communications. The communication via the wireless communication controller 245 can be encrypted to protect the data exchanged between the power tool device and the external device 250 from third parties.

In the illustrated embodiment, the wireless communication controller 245 is a Bluetooth® controller. The Bluetooth® controller communicates with the external device 250 employing the Bluetooth® protocol. Therefore, in the illustrated embodiment, the external device 250 and the power tool device are within a communication range (i.e., in proximity) of each other while they exchange data. In other embodiments, the wireless communication controller 245 communicates using other protocols (e.g., Wi-Fi, ZigBee, a proprietary protocol, etc.) over different types of wireless networks. For example, the wireless communication controller 245 may be configured to communicate via Wi-Fi through a wide area network such as the Internet or a local area network, or to communicate through a piconet (e.g., using infrared or NFC communications).

In some embodiments, the network is a cellular network, such as, for example, a Global System for Mobile Communications ("GSM") network, a General Packet Radio Service ("GPRS") network, a Code Division Multiple Access ("CDMA") network, an Evolution-Data Optimized ("EV-DO") network, an Enhanced Data Rates for GSM Evolution ("EDGE") network, a 3GSM network, a 4GSM network, a 4G LTE network, 5G New Radio, a Digital Enhanced Cordless Telecommunications ("DECT") network, a Digital AMPS ("IS-136/TDMA") network, or an Integrated Digital Enhanced Network ("iDEN") network, etc.

The wireless communication controller 245 is configured to receive data from the controller 200 and relay the information to the external device 250 via the antenna and transceiver 315. In a similar manner, the wireless communication controller 245 is configured to receive information (e.g., configuration and programming information) from the external device 250 via the antenna and transceiver 315 and relay the information to the controller 200.

Figure 4:
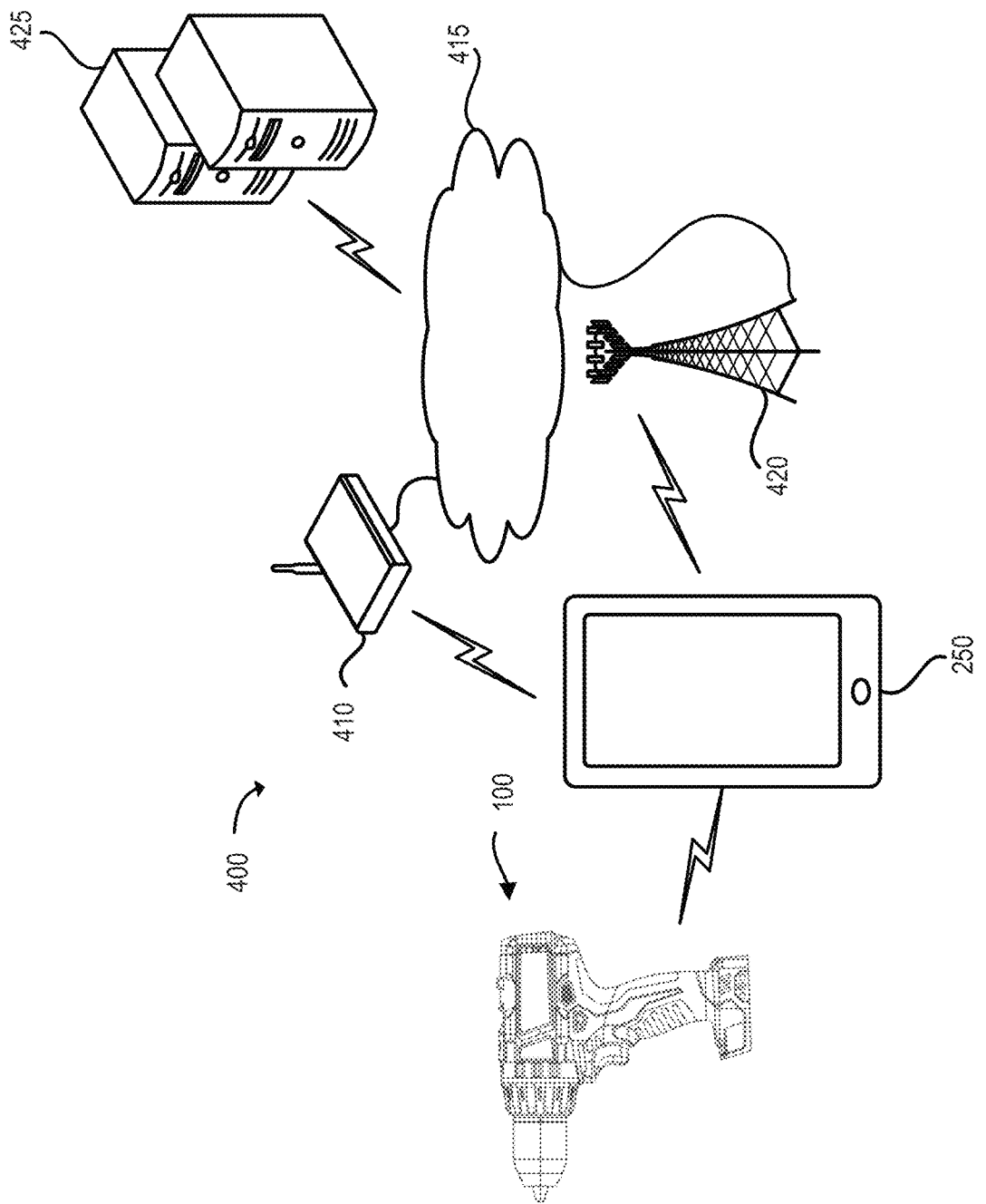
FIG. 4 illustrates a communication system for the power tool of FIG. 1, in accordance with embodiments described herein.

FIG. 4 illustrates a communication system 400. The communication system 400 includes at least one power tool 100 and the external device 250. Each power tool 100 and the external device 250 can communicate wirelessly while they are within a communication range of each other. Each power tool 100 may communicate power tool status, power tool operation statistics, power tool identification, power tool sensor data, stored power tool usage information, power tool maintenance information, and the like.

The external device 250 is, for example, a smart phone (as illustrated), a laptop computer, a tablet computer, a personal digital assistant ("PDA"), or another electronic device capable of communicating wirelessly with the power tool 100 and providing a user interface. The external device 250 provides the user interface and allows a user to access and interact with the power tool 100. The external device 250 can receive user inputs to determine operational parameters, enable or disable features (such as a low-power operating mode), and the like. The user interface of the external device 250 provides an easy-to-use interface for the user to control and customize operation of the power tool 100. The external device 250, therefore, grants the user access to tool operational data of the power tool 100, and provides a user interface such that the user can interact with the controller 200 of the power tool 100.

In addition, as shown in FIG. 4, the external device 250 can also share the tool operational data obtained from the power tool 100 with a remote server 425 connected through a network 415. The remote server 425 may be used to store the tool operational data obtained from the external device 250, provide additional functionality and services to the user, or a combination thereof. In some embodiments, storing the information on the remote server 425 allows a user to access the information from a plurality of different locations. In some embodiments, the remote server 425 collects information from various users regarding their power tools and provide statistics or statistical measures to the user based on information obtained from the different power tools. For example, the remote server 425 may provide statistics regarding the experienced efficiency of the power tool 100, typical usage of the power tool 100, and other relevant characteristics and/or measures of the power tool 100. The network 415 may include various networking elements (routers 410, hubs, switches, cellular towers 420, wired connections, wireless connections, etc.) for connecting to, for example, the Internet, a cellular data network, a local network, or a combination thereof as previously described. In some embodiments, the power tool 100 is configured to communicate directly with the server 425 through an additional wireless interface or with the same wireless interface that the power tool 100 uses to communicate with the external device 250.

Figure 5:
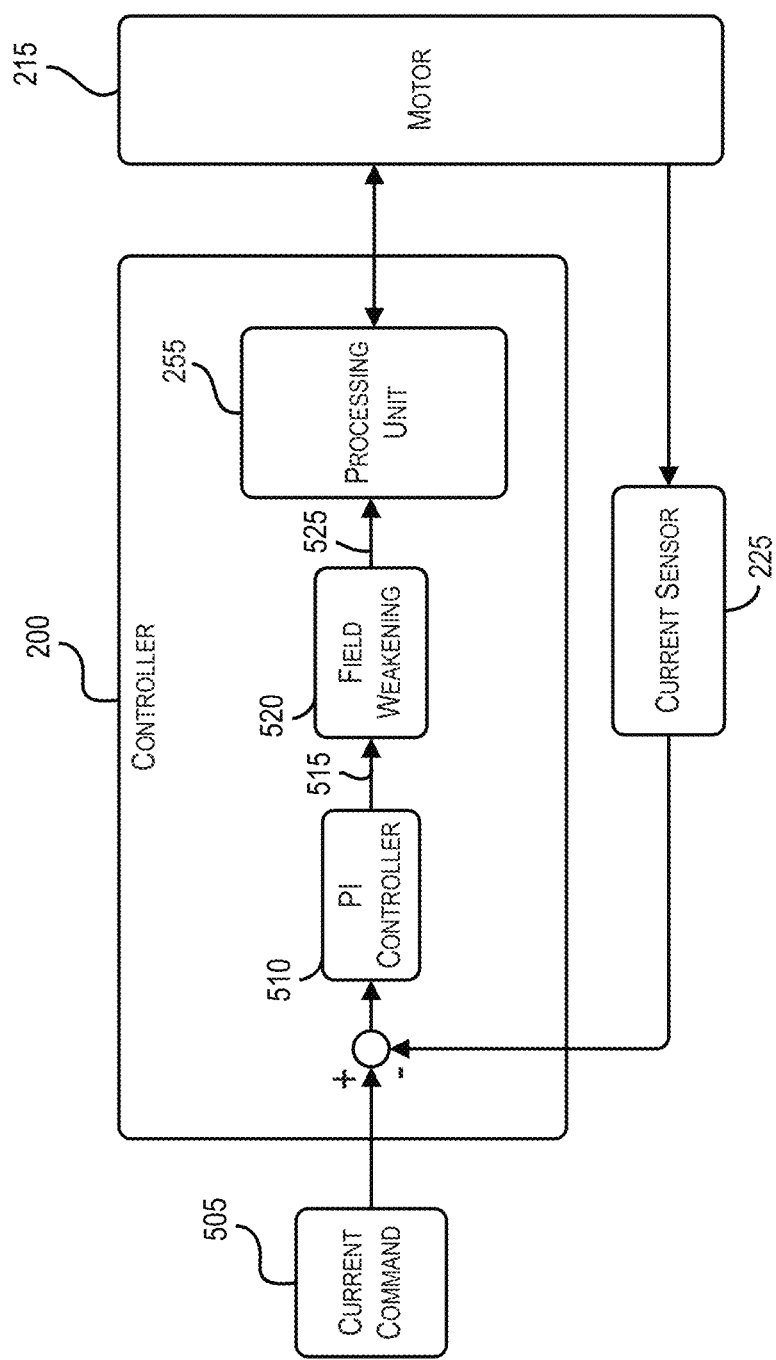
FIG. 5 illustrates a block diagram of a current-based field weakening technique executed by the controller of FIG. 2, in accordance with embodiments described herein.

FIG. 5 illustrates a block diagram of a current-based field weakening control executed by the controller 200, according to some embodiments. In the embodiment illustrated in FIG. 5, the controller 200 further includes a proportional-integral ("PI") controller 510 and a field weakening controller 520 (e.g., stored within the memory 260). As previously described, the one or more current sensors 225 sense information regarding the current supplied to the motor 215 and/or the power tool 100. The controller 200 receives a signal indicative of the current supplied to the motor 215 via the one or more current sensors 225. The controller 200 generates a current command 505 that is combined with a sensed current feedback signal from the current sensor 225 and provided to the PI controller 510. Based on the current command 505 and the sensed current from the current sensor 225, the PI controller 510 generates and provides one or more field weakening reference signals 515 to the field weakening controller 520. In some embodiments, the field weakening controller 520 determines one or more motor control signals 525 to provide the processing unit 255. For example, the one or more motor control signals 525 can be indicative of a pulse-width modulation ("PWM") signal with a duty cycle and/or a conduction angle (e.g., a conduction angle in degrees) to provide to the motor 215 to execute a control operation. Based on the one or more motor control signals 525, the processing unit 255 determines, for example, a PWM signal having a duty cycle and a conduction angle to apply to the motor 215. The sensed current feedback signal in conjunction with a subsequently generated current command 505 are provided to the PI controller 510 to initiate a subsequent control operation. In some embodiments, the subsequent field weakening operation includes a first variation in the PWM signal applied to the motor 215. In some embodiments, the controller 200 receives a sensed current feedback signal, via the one or more current sensors 225, indicative of a current supplied by the motor 215 during the control operation when the conduction angle is used to increase the current applied to the motor 215. The current feedback signal in conjunction with a subsequently generated current command 505 are again provided to the PI controller 510 to initiate a subsequent control operation. In some embodiments, the subsequent field weakening operation includes a first variation in the conduction angle applied to the motor 215 (e.g., an increase in the conduction angle).

Figure 6:
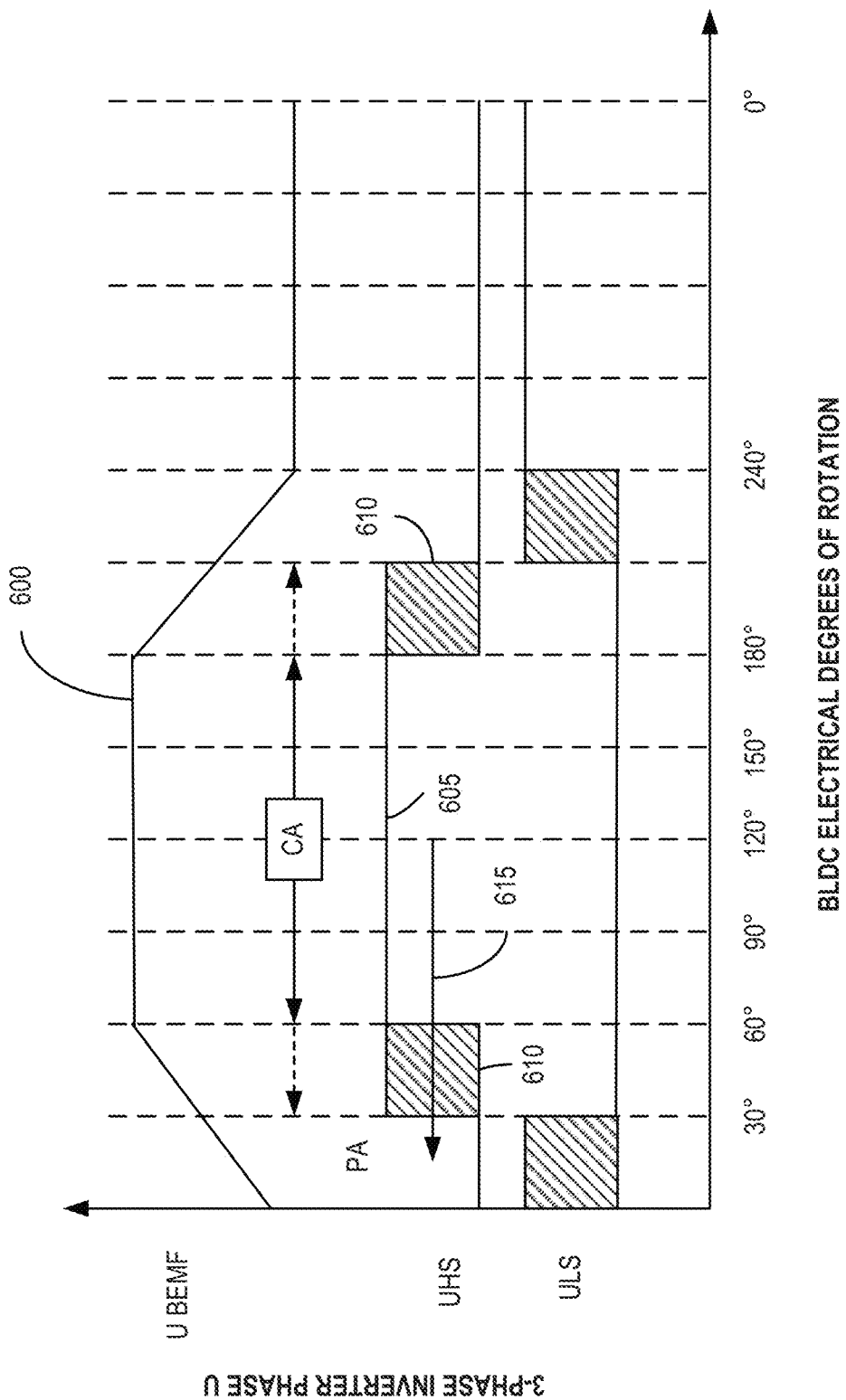
FIG. 6 is a graph showing commutation of a brushless motor, in accordance with embodiments described herein.

In some embodiments, the conduction angle of the motor 215 may be varied to increase the conduction angle. Generally, a conduction angle applied to a BLDC motor (e.g., the motor 215) is set to a default value (e.g., approximately 105°, approximately 120°, between 90° and 120°, etc.). However, in order to increase speed, such as via field weakening, the conduction angle for a given phase may be increased up to a maximum value, such as 180°. As shown in FIG. 6, an example of commutation applied to a BLDC motor is shown. The back emf ("BEMF") 600 generally tracks with the conduction angle 605. As shown in FIG. 6, the conduction angle may generally be 120° and applied to either a high side switch (such as high side FETs) or low side switches (such as low side FETs) as described above, in order to drive a motor 215. As further shown in FIG. 6, the conduction angle 605 may be increased (as shown by optional conduction regions 610) from 120° to a maximum value, such as 180°. Further, as noted above, the conduction angle 605 may be shifted to occur earlier in the conduction cycle (i.e., phase advance), as shown by phase advance line 615.

Figure 7:
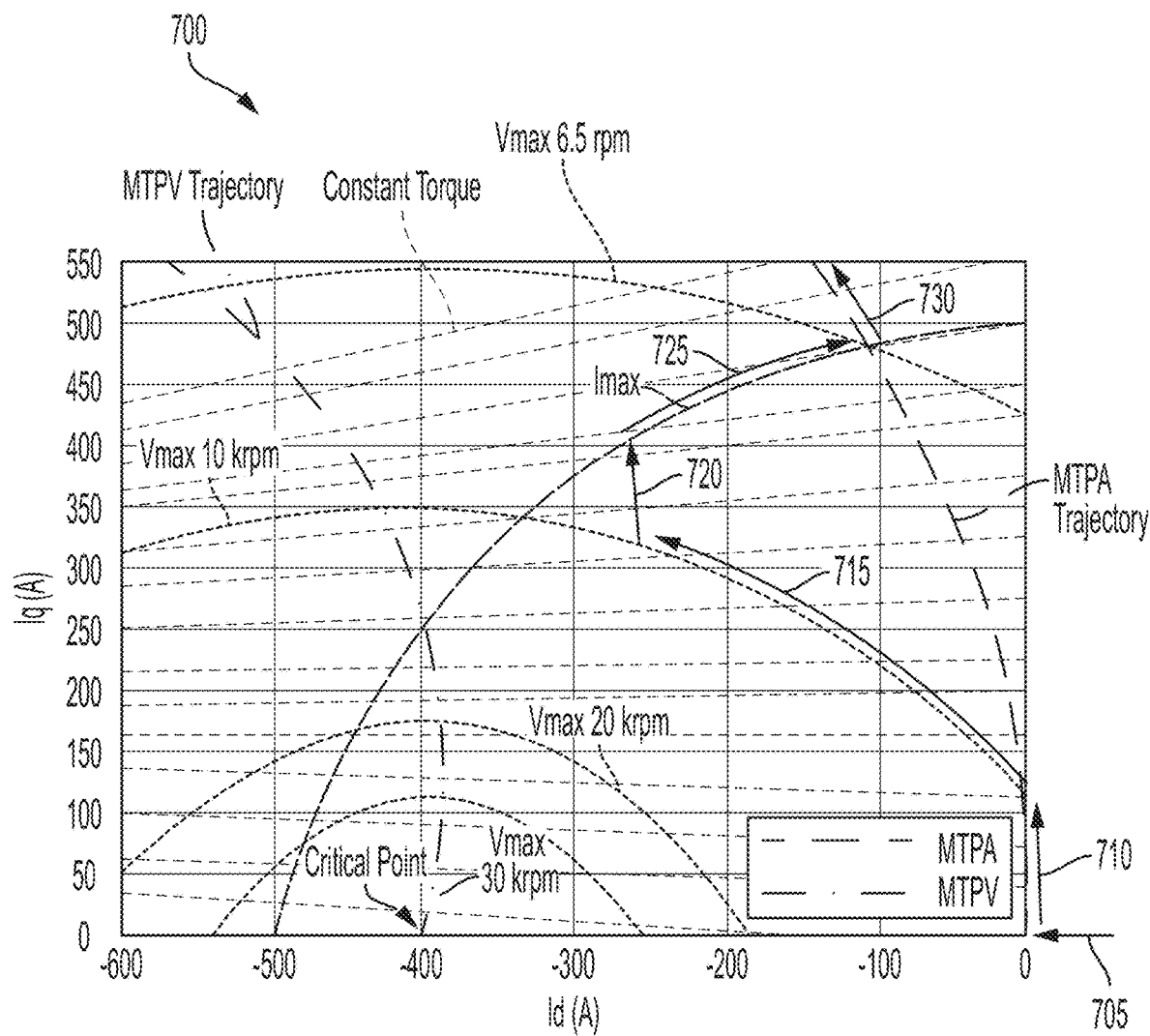
FIG. 7 is a graph illustrating a current-based control for use in the power tool of FIG. 1, in accordance with embodiments described herein.

FIG. 7 is a graph 700 illustrating a current-based field weakening control operation, via the field weakening controller 520 of FIG. 5, for use in the power tool of FIG. 1. In the illustrated embodiment, the field weakening controller 520 begins at a point 705 in which there is no current provided to the motor 215. As the motor 215 receives current during operation, the field weakening controller 520 receives the field weakening reference signals 515 and sets a PWM signal having a duty cycle to control the switching bridge 210 to increase motor current and follow a max-torque-per-amps ("MTPA") curve or trajectory 710 (e.g., a first trajectory) until reaching a second curve or trajectory 715. During the MTPA current control, the conduction angle (e.g., a first conduction angle) of the motor 215 remains at a default value (e.g., a 105 degree conduction angle, a conduction angle between 90 degrees and 135 degrees, etc.). The MTPA current control (described in further detail below) is used to determine a current command signal corresponding to a maximum amount of torque per amp that can be provided by the motor 215. During the MTPA curve or trajectory 710, the motor speed is maintained at zero steady-state error and the motor power increases accordingly with the increase in duty cycle of the PWM signal. In some embodiments, the MTPA current control is different from the example shown in FIG. 7. At the second curve or trajectory 715, the duty cycle of the PWM signal has reached a first threshold (e.g., 100% duty cycle). After the second trajectory 715 has been reached, duty cycle can no longer be increased to increase the current provided to the motor 215. As a result, the field weakening controller 520 maintains or locks the duty cycle of the PWM signal at the first threshold. During the second trajectory 715, the motor speed continues to be maintained at zero steady-state error and the motor power increases accordingly with the increase in conduction angle.

In some embodiments, the field weakening controller 520 can then control the conduction angle of the motor 215 to follow a third curve or trajectory 720 and to further increase the current provided to the motor 215. For the third trajectory 720, the conduction angle is at maximum conduction angle (e.g., between 130 degrees and 180 degrees). For example, the field weakening controller 520 reduces the maximum conduction angle to preserve losses of the motor at the expense of power throughput. In other examples, the field weakening controller 520 increases the maximum conduction angle to increase power throughput at the expense of higher losses while achieving the power throughput. If the current supplied to the motor 215 reaches a second threshold (e.g., a maximum current), the field weakening controller 520 continues to maintain the duty cycle of the PWM signal at the first threshold and conduction angle starts to decrease while the current command is constant at its maximum value along a fourth curve or trajectory 725. As speed decreases along the fourth trajectory 725, the back-emf of the motor 215 decreases and causes an increase in motor current. As the motor current increases, the field weakening controller 520 corrects for the increase in motor current by decreasing the second conduction angle. By decreasing the conduction angle, the motor 215 produces more torque per amp and allows the load to be sustained by the motor 215 without a change to the steady-state power source current. If the conduction angle reaches a third threshold, the field weakening controller 520 continues to maintain the duty cycle of the PWM signal at the first threshold and maintains the conduction angle at the third threshold.

In some embodiments, the field weakening controller 520 controls the conduction angle of the motor 215 back to the minimum conduction angle (e.g., a minimum saturation point). After the conduction angle reaches the minimum saturation point, the field weakening controller 520 controls the current by maintaining the duty cycle of the PWM signal at the first threshold to follow a fifth curve or trajectory 730 (e.g., an overdrive trajectory). The overdrive trajectory 730 allows the motor 215 to operate with a motor current above the second threshold by continuing to follow the MTPA trajectory 710 once the conduction angle is reduced to the minimum saturation point. During the fifth trajectory 730, the speed of the motor decreases as the load experienced by the motor increases and no change in conduction angle is applied by the field weakening controller 520. In some embodiments, after the second conduction angle reaches the minimum saturation point and the current returns to the second threshold by achieving a greater speed based on a reduced torque load, the field weakening controller 520 can increase the conduction angle again to further increase the motor current. In some embodiments, the motor power is based on the voltage received by the motor 215 from the power source 205 once the conduction angle reaches the minimum saturation point. While the above sequence has been generally described in order of increasing torque, the sequence may also be followed in reverse order in the case of decreasing torque.

In some embodiments, MTPA occurs between a conduction angle of 90 degrees and 135 degrees due to the torque from permanent magnets of the motor 215 and the torque from saliency reluctance of the motor 215. The torque from permanent magnets of the motor 215 is maximized and has a proportional relationship to the current magnitude when the current is placed orthogonally compared to the permanent magnets in the direction of current $i_q$. The torque from the saliency reluctance of the motor 215 is maximized and has a proportional relationship to a square of current magnitude when the current is placed 135 degrees ahead of the permanent magnets between a negative current direction of $i_d$ and the current direction $i_q$. Considering the torque from permanent magnets of the motor 215 and the torque from saliency reluctance of the motor 215 both occur during operation of the motor, the optimum torque achieved by the motor exists between a conduction angle of 90 degrees and 135 degrees. The field weakening controller 520 can calibrate a minimum conduction angle using open-loop control based on the current command 505. Once the field weakening operation is activated (e.g., the duty cycle of the PWM signal reaches the first threshold), the field weakening controller 520 can increase the conduction angle from the minimum conduction angle. During a field weakening operation, the field weakening controller 520 determines a conduction angle where the duty cycle of the PWM signal is at the first threshold and the desired current is produced. The determined conduction angle allows the motor 215 to produce the highest torque possible for the desired current at a motor speed (e.g., within bus voltage limitations). In some embodiments, lower torque values can be produced at the desired current and the motor speed if the duty cycle of the PWM signal is less than the first threshold. In other words, the field weakening algorithm inherently determines MTPA when the duty cycle of the PWM signal reaches the first threshold.

Figure 8A:
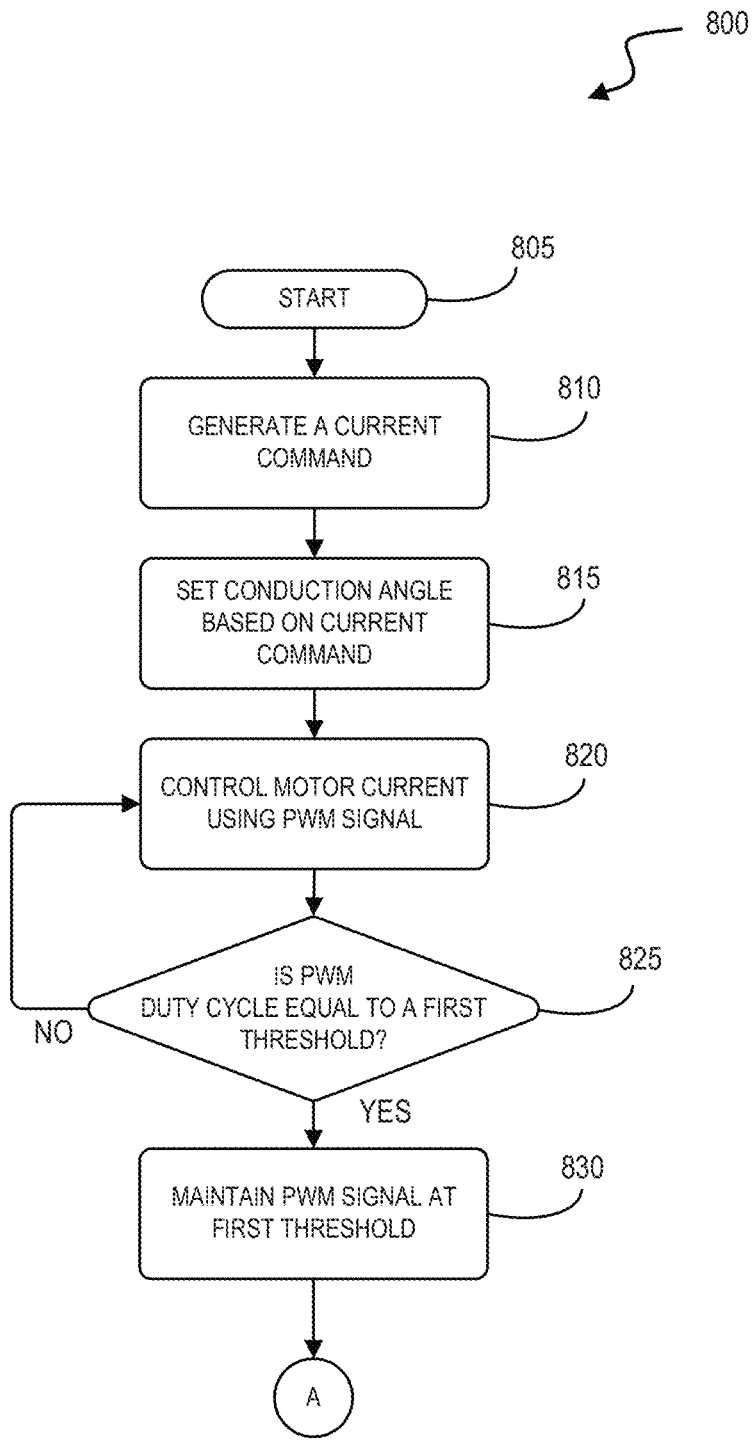
FIGS. 8A and 8B illustrate a flow chart of a method for implementing a current-based field weakening, in accordance with embodiments described herein.
Figure 8B:
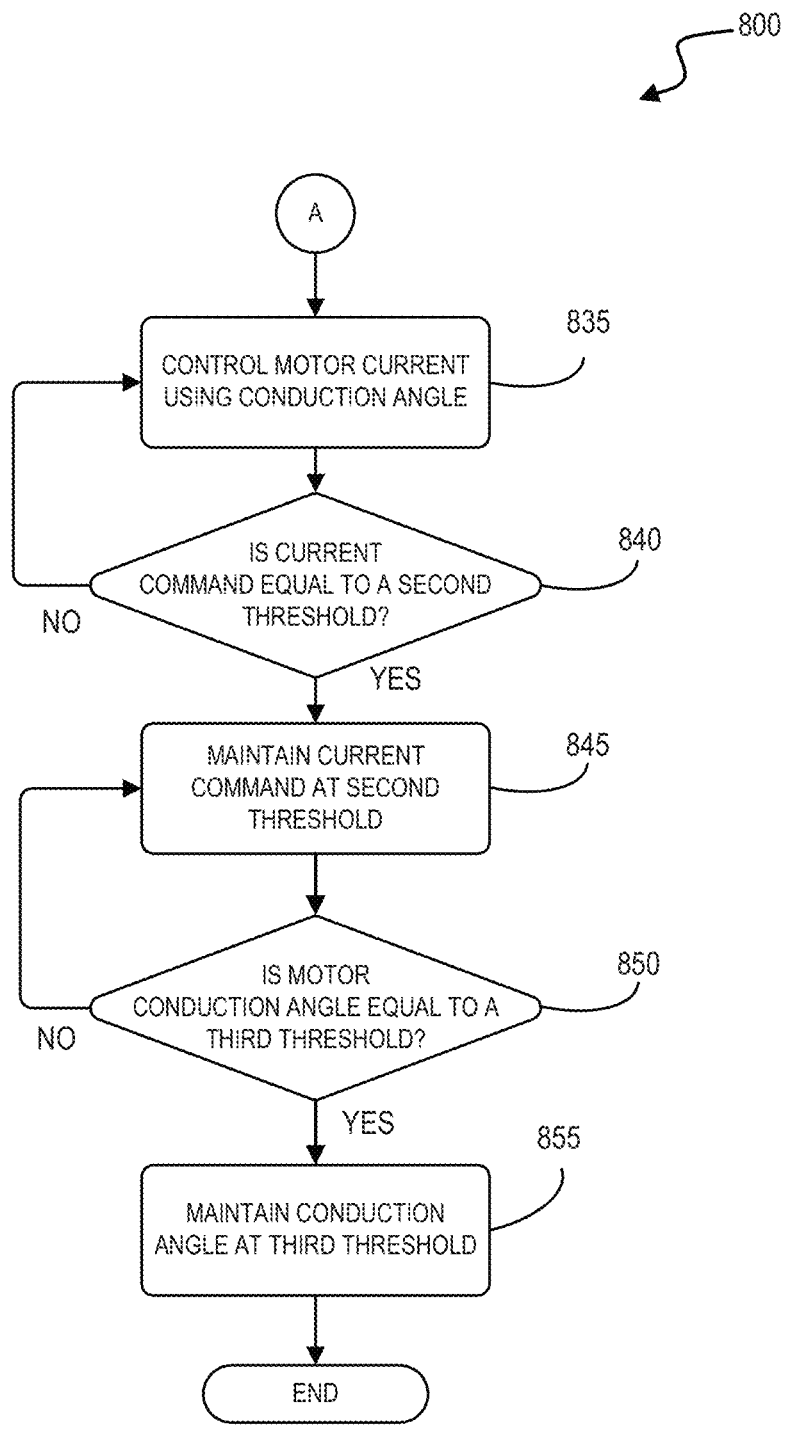

FIGS. 8A and 8B illustrate a flow chart of a method 800 for implementing the above-described current-based field weakening. The method 800 begins with the power on of the power tool 100 and the controller 200 (BLOCK 805). The method 800 includes the controller 200 generating a current command 505 based on a characteristic of the motor 215 during operation (e.g., a MTPA trajectory) (BLOCK 810). The method 800 also includes setting a conduction angle of the motor 215 (e.g., a default conduction angle), via the controller 200, based on the current command 505 (BLOCK 815). The method 800 also includes supplying a PWM signal with a duty cycle to the motor 215 to control the motor current (e.g., in order to achieve the current command 505) (BLOCK 820). The method 800 further includes determining if the duty cycle of the PWM signal is equal to a first threshold (BLOCK 825). If the duty cycle of the PWM signal is determined to be equal to the first threshold (e.g., a 100% duty cycle, a 95% duty cycle, a duty cycle less than 100%, etc.), the controller 200 maintains the duty cycle of the PWM signal at the first threshold (BLOCK 830). In some embodiments, the controller 200 only maintains the PWM signal at the first threshold (e.g., a maximum PWM duty cycle) when the commanded motor current requires the PWM signal at the first threshold. If, for example, the loading of the power tool was reduced and less current would be required, the controller 200 could reduce the current command (e.g., to the point where PWM control is reduced below the first threshold value). If the duty cycle of the PWM signal is not determined to be equal to the first threshold, the method returns to BLOCK 820 to continue controlling the motor current using the PWM signal.

With reference to FIG. 8B, the method 800 also includes controlling the conduction angle, via the controller 200, to the motor 215 to control the motor current after the duty cycle of the PWM signal reaches and is maintained at the first threshold (BLOCK 835). The method 800 also includes determining, via the controller 200, if the current command 505 is equal to a second threshold (BLOCK 840). In some embodiments, the current command 505 is restricted, via the controller 200, to stay at the second threshold. If the motor current does not provide enough torque to maintain a load of the motor 215, speed and back-emf of the motor decrease so that the motor current increases above the current command 505. In some embodiments, the controller 200 determines a decrease in conduction angle to apply to the motor 215 to correct for the excess motor current. The decrease in conduction angle of the motor 215 allows the motor 215 to create more torque at the expense of speed without changing a steady-state current of the motor 215. If the motor current is determined to be equal to the second threshold, the controller 200 can then further control the conduction angle to maintain the motor current at the second threshold (BLOCK 845). In some embodiments, the controller 200 only maintains the motor current at the second threshold when the maximum motor current is commanded (e.g., based on how the power tool 100 is being driven). If, for example, the loading of the power tool was reduced and less current would be required, the controller 200 could reduce the current command (e.g., to the point where PWM control is reduced below the first threshold value). If the motor current is not determined to be equal to the second threshold, the method 800 returns to BLOCK 835 to continue controlling the motor current by controlling the conduction angle with the PWM signal maintained or locked at the first threshold value.

In some embodiments, the method 800 also includes determining if the motor conduction angle is equal to a third threshold (e.g., a maximum conduction angle, a conduction angle between 130° and 180°, etc.) (BLOCK 850). If the motor conduction angle is determined to be equal to the third threshold, the controller 200 maintains the conduction angle at the third threshold (BLOCK 855), if the commanded current still warrants the current at the second threshold value. If the motor conduction angle is not determined to be equal to the third threshold, the method 800 returns to BLOCK 845 to continue to control conduction angle to maintain the motor current at the second threshold value. Once the motor conduction angle is maintained at the third threshold, the method 800 ends, and the PWM signal, the motor current, and the motor conduction angle have all reached maximum values. At any point throughout the method 800, the PWM signal and conduction angle do not necessarily need to be controlled to their maximum permissible values if the current command for the power tool 100 does not warrant such values. At points throughout the method 800, if the load experienced by the motor 215 is relieved, the method 800 can return to BLOCK 810 to generate a subsequent current command 505.

Figure 9A:
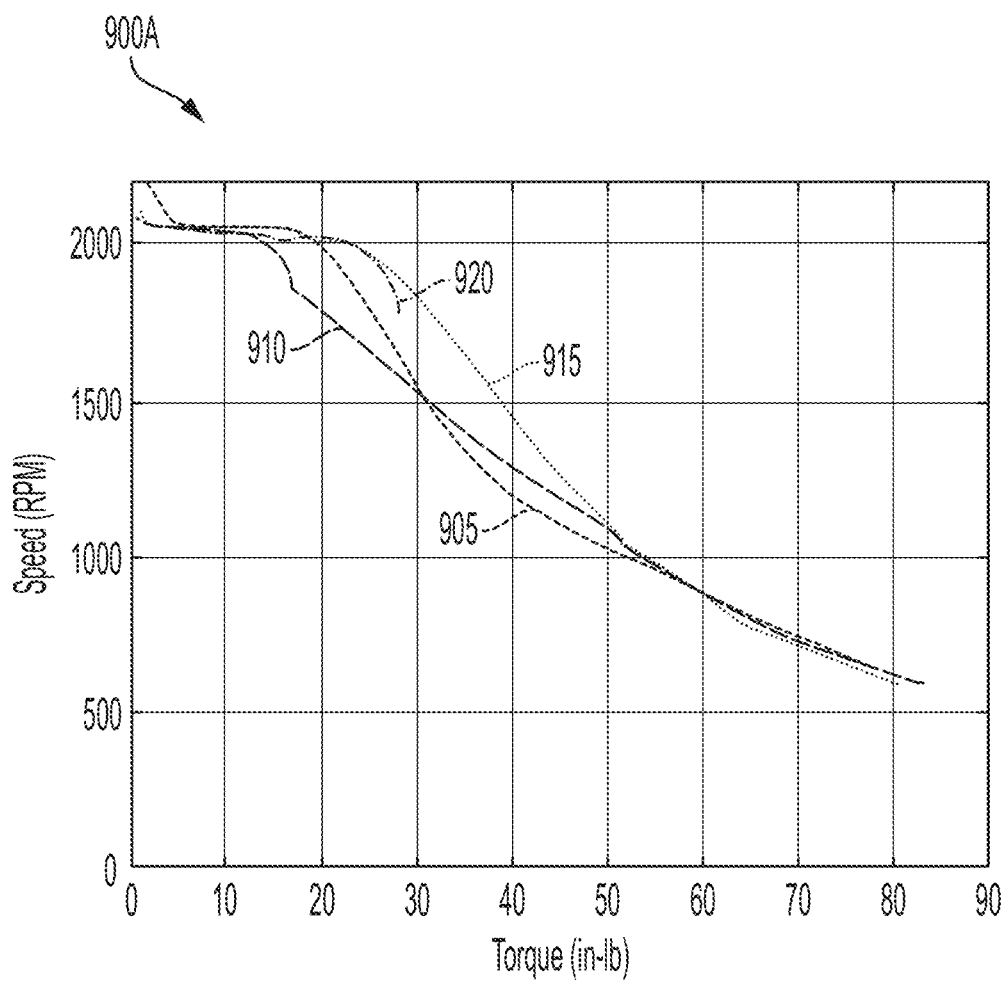
FIGS. 9A-9L are graphs illustrating relationships between torque and other parameters based on the current-based field weakening of FIGS. 8A and 8B, in accordance with embodiments described herein.

FIG. 9A is a graph 900A illustrating a relationship between torque of the motor 215 and revolutions per minute ("RPM") of the motor 215 for a high impedance battery pack (e.g., a 5S1P 2.0 Amp-hour battery pack). Specifically, the graph 900A illustrates an increase in torque of the motor 215 as the RPM of the motor 215 generally decreases. The same reference numerals are used within FIGS. 9A-9L to signify the properties of the same control techniques for different parameters. Line 905 shows the relationship between torque and RPM during a normal operation of a conventional field weakening technique. Line 910 shows the relationship between torque and RPM while implementing the current-based field weakening described herein where the conduction angle is limited and the current is limited. Line 915 shows the relationship between torque and RPM while implementing current-based field weakening where the conduction angle is maximized and the current is limited. Line 920 shows the relationship between torque and RPM while implementing current-based field weakening where the conduction angle is maximized and the current is maximized. Line 905 illustrates a greater decrease in RPM during normal operation as the torque increases compared to the current-based field weakening of lines 910, 915, and 920. Line 910 represents a high efficiency tuning of the of the current-based field weakening, and line 915 represents a high power tuning of the current-based field weakening.

Figure 9B:
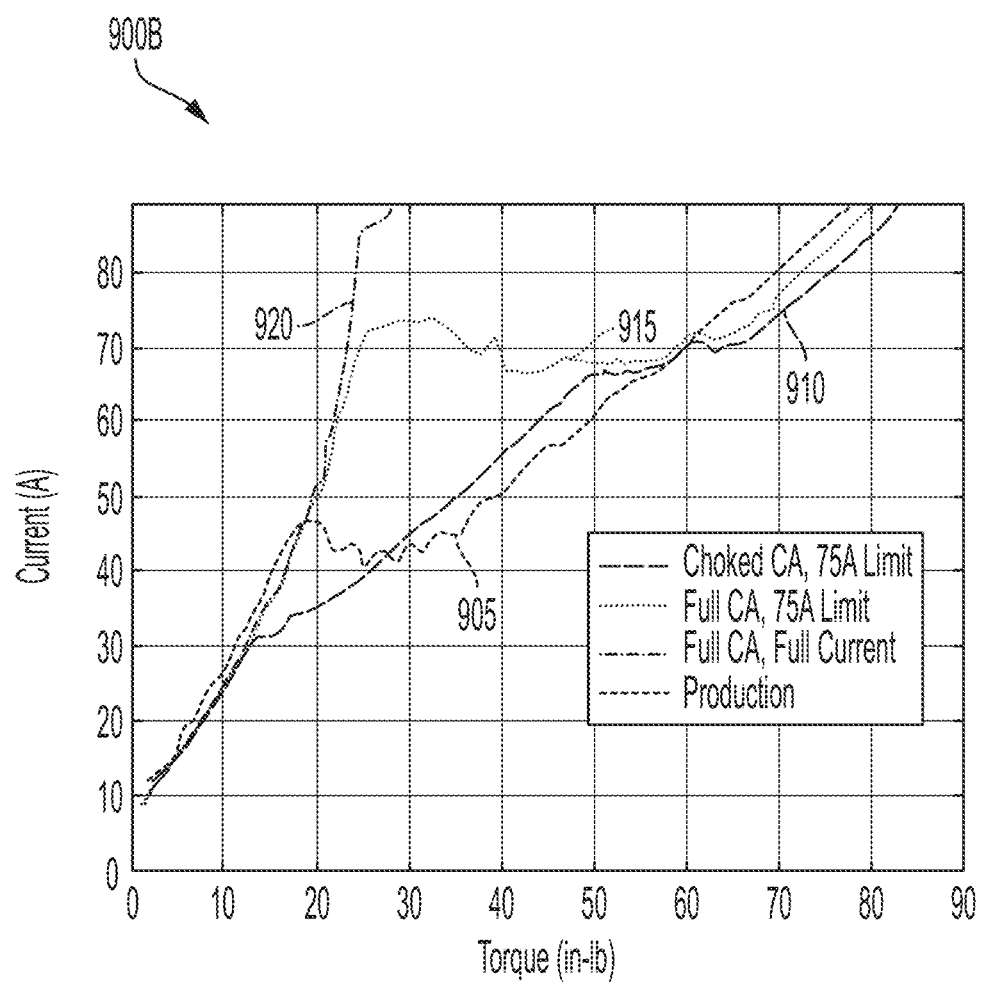

FIG. 9B is a graph 900B illustrating a relationship between torque of the motor 215 and current of the motor 215 for the high impedance battery pack. Specifically, the graph 900B illustrates an increase in current of the motor 215 as the torque of the motor 215 increases. Line 905 shows the relationship between torque and current during a normal operation of a conventional field weakening technique. Line 910 shows the relationship between torque and current while implementing current-based field weakening where the conduction angle is limited and the current is limited. Line 915 shows the relationship between torque and current while implementing current-based field weakening where the conduction angle is maximized and the current is limited. Line 920 shows the relationship between torque and current while implementing current-based field weakening where the conduction angle is maximized and the current is maximized. Lines 910, 915, and 920 showing current-based field weakening illustrate a greater increase in current as the torque increases compared to the conventional field weakening of line 905.

Figure 9C:
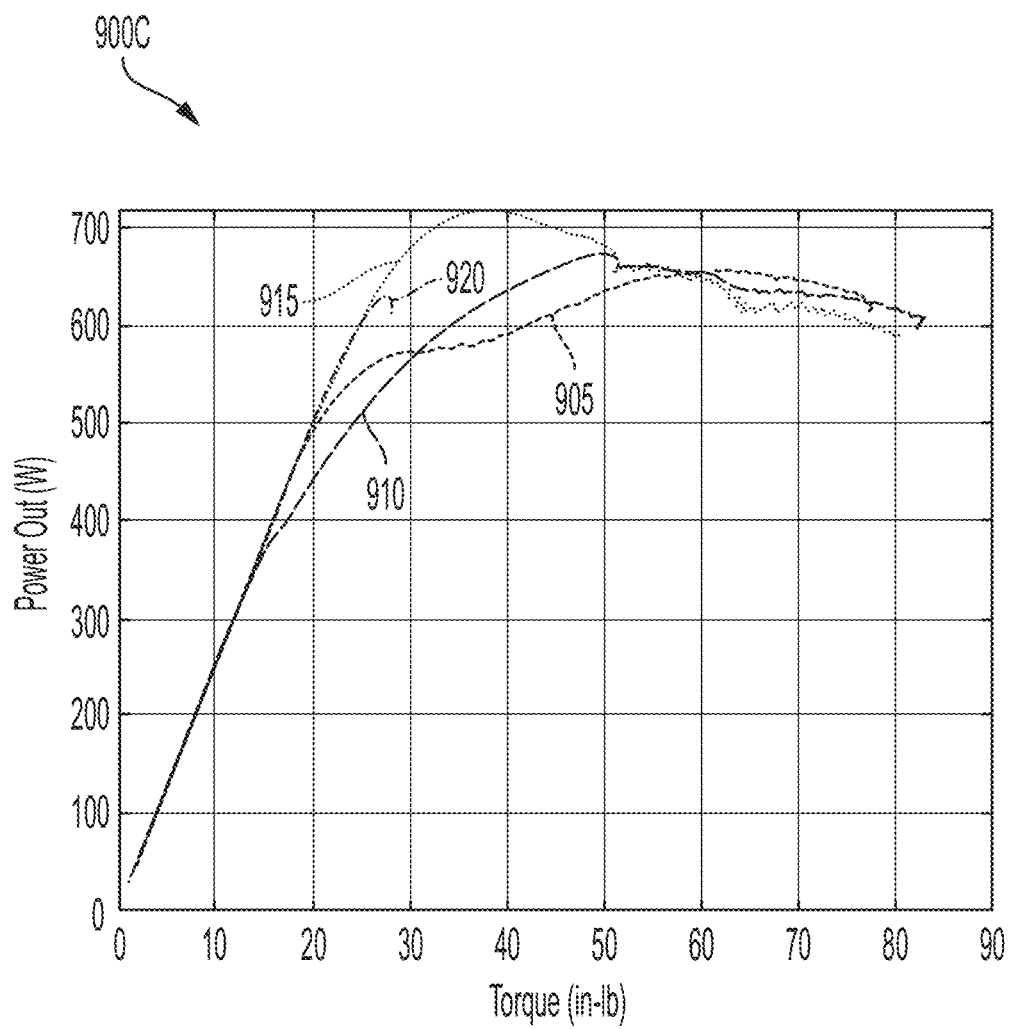

FIG. 9C is a graph 900C illustrating a relationship between torque of the motor 215 and output power of the motor 215 for the high impedance battery pack. Specifically, the graph 900C illustrates an increase in output power of the motor 215 as the torque of the motor increases. Line 905 shows the relationship between torque and output power during a normal operation of a conventional field weakening technique. Line 910 shows the relationship between torque and output power while implementing current-based field weakening where the conduction angle is limited and the current is limited. Line 915 shows the relationship between torque and output power while implementing current-based field weakening where the conduction angle is maximized and the current is limited. Line 920 shows the relationship between torque and output power while implementing current-based field weakening where the conduction angle is maximized and the current is maximized. Lines 910, 915, and 920 illustrate a greater increase (e.g., a 20% increase in peak power delivered with the same tool losses) in output power using current-based field weakening as the torque increases compared to the conventional field weakening of line 905. When compared to the conventional field weakening of line 905, the lines 910, 915, and 920 produce a smoother output power.

Figure 9D:
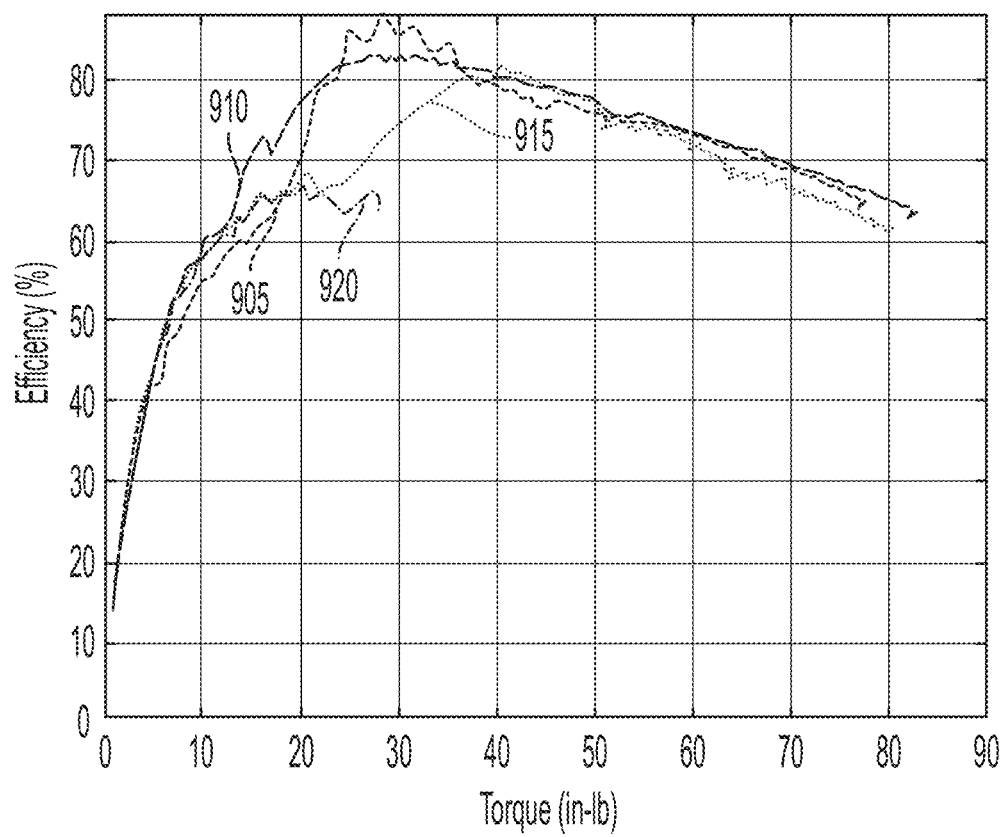

FIG. 9D is a graph 900D illustrating a relationship between torque of the motor 215 and efficiency of the motor 215 for the high impedance battery pack. Specifically, the graph 900D illustrates an increase in efficiency of the motor 215 as the torque and speed achieved are equal. Line 905 shows the relationship between torque and efficiency during a normal operation of a conventional field weakening technique. Line 910 shows the relationship between torque and efficiency while implementing current-based field weakening where the conduction angle is limited and the current is limited. Line 915 shows the relationship between torque and efficiency while implementing current-based field weakening where the conduction angle is maximized and the current is limited. Line 920 shows the relationship between torque and efficiency while implementing current-based field weakening where the conduction angle is maximized and the current is maximized. Lines 910, 915, and 920 illustrate a similar increase in efficiency as the torque increases compared to the conventional field weakening of line 905.

Figure 9E:
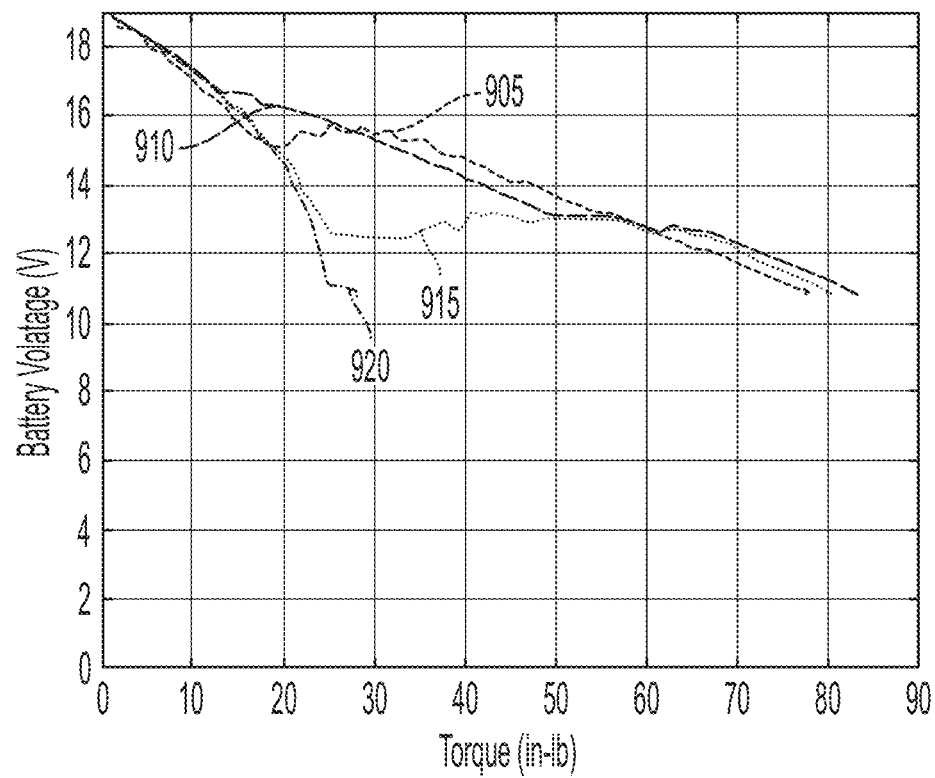

FIG. 9E is a graph 900E illustrating a relationship between torque of the motor 215 and voltage of the power source 205 for the high impedance battery pack. Specifically, the graph 900E illustrates a decrease in voltage of the power source as the torque of the motor increases. Line 905 shows the relationship between torque and battery pack voltage during a normal operation of a conventional field weakening technique. Line 910 shows the relationship between torque and battery pack voltage while implementing current-based field weakening where the conduction angle is limited and the current is limited. Line 915 shows the relationship between torque and battery pack voltage while implementing current-based field weakening where the conduction angle is maximized and the current is limited. Line 920 shows the relationship between torque and battery pack voltage while implementing current-based field weakening where the conduction angle is maximized and the current is maximized. Lines 910, 915, and 920 illustrate a greater rate of decrease in power source voltage as the torque increases for current-based field weakening compared to the conventional field weakening of line 905. Line 915 illustrates a consistent and controlled load placed on the high impedance battery pack.

Figure 9F:
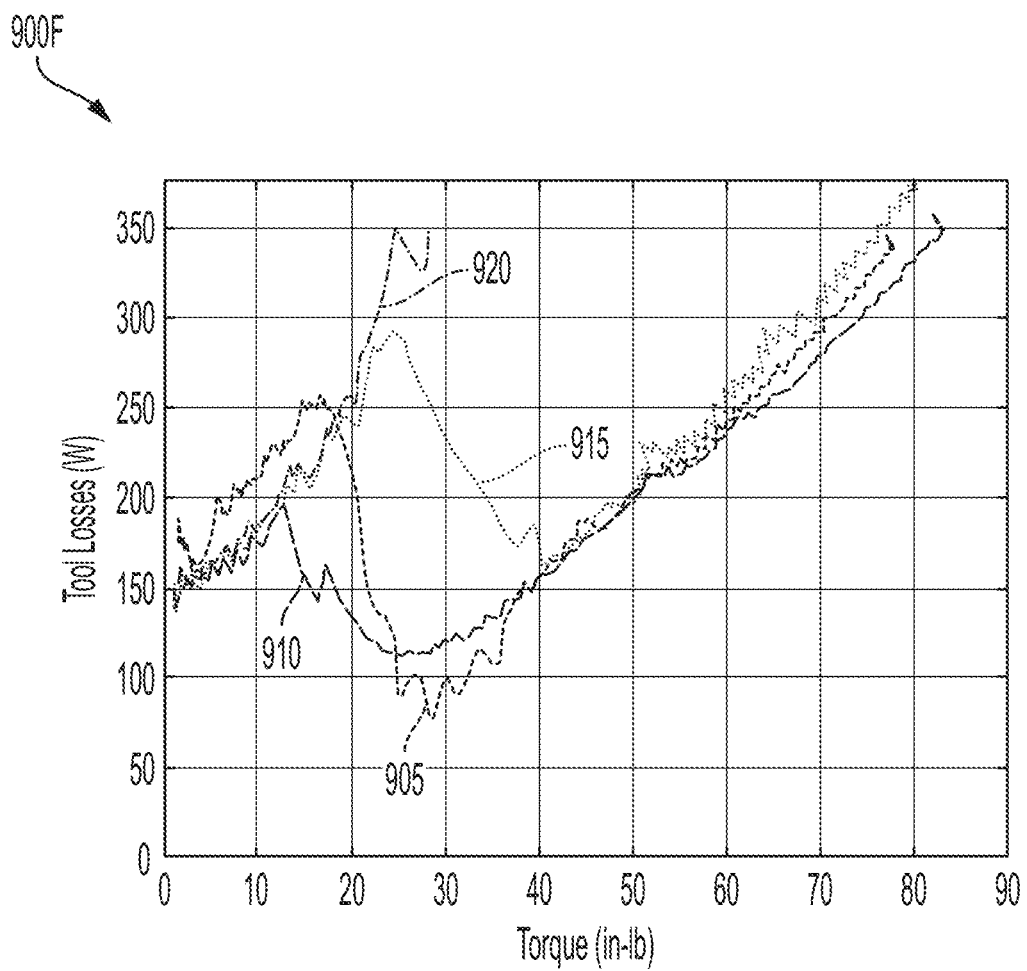

FIG. 9F is a graph 900F illustrating a relationship between torque of the motor 215 and power loss of the power tool 100 for the high impedance battery pack. Specifically, the graph 900F illustrates an overall increase in power loss as the torque of the motor increases. Line 905 shows the relationship between torque and power loss during a normal operation of a conventional field weakening technique. Line 910 shows the relationship between torque and power loss while implementing current-based field weakening where the conduction angle is limited and the current is limited. Line 915 shows the relationship between torque and power loss while implementing current-based field weakening where the conduction angle is maximized and the current is limited. Line 920 shows the relationship between torque and power loss while implementing current-based field weakening where the conduction angle is maximized and the current is maximized. Lines 910, 915, and 920 illustrate a similar increase in power loss as the torque increases compared to line 905. However, the current-based field weakening of lines 910, 915, and 920 produce considerably more power for the same power loss compared to line 905, thereby allowing the power tool 100 to utilize more power from previously underutilized battery packs.

Figure 9G:
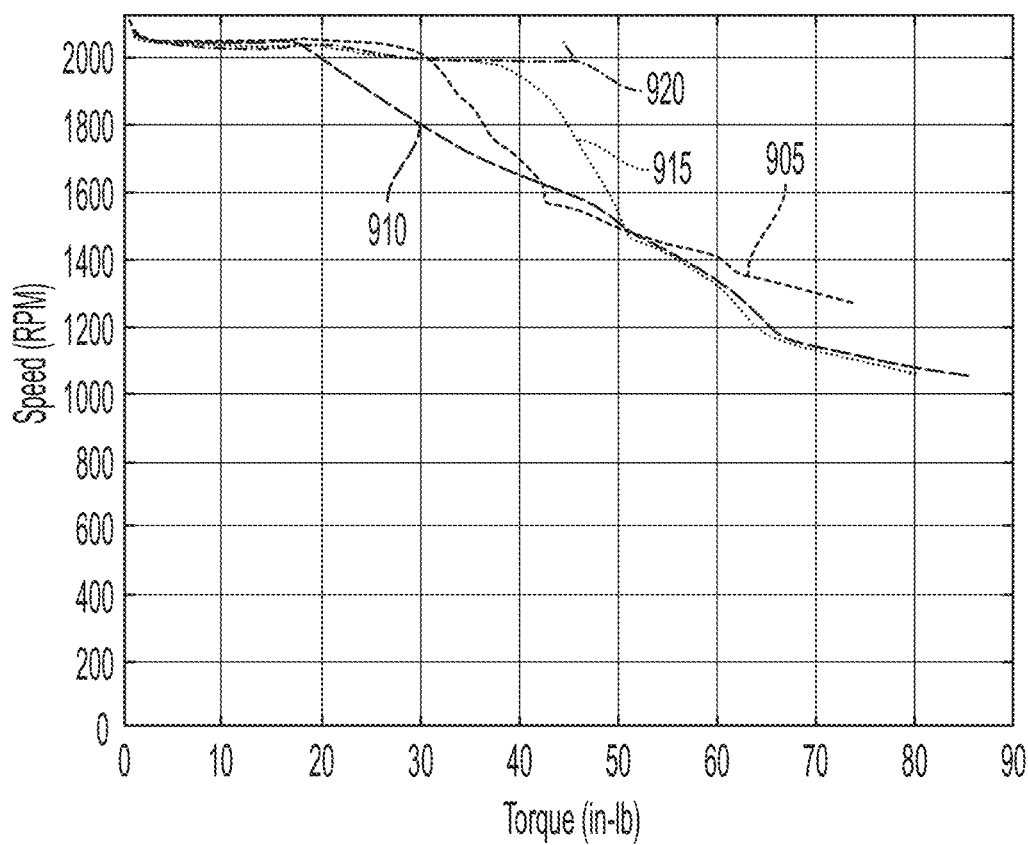

FIG. 9G is a graph 900G illustrating a relationship between torque of the motor 215 and revolutions per minute ("RPM") of the motor 215 for a low impedance battery pack (e.g., a 5S4P battery pack). Specifically, the graph 900G illustrates an increase in torque of the motor 215 as the RPM of the motor 215 generally decreases. Line 905 shows the relationship between torque and RPM during a normal operation of a conventional field weakening technique. Line 910 shows the relationship between torque and RPM while implementing current-based field weakening where the conduction angle is limited and the current is limited. Line 915 shows the relationship between torque and RPM while implementing current-based field weakening where the conduction angle is maximized and the current is limited. Line 920 shows the relationship between torque and RPM while implementing current-based field weakening where the conduction angle is maximized and the current is maximized. When compared to the conventional field weakening of line 905, the lines 910, 915, and 920 produce a smoother torque speed output. Lines 915 and 920 produce a greater torque at max speed compared to line 905. Line 910 accepts a minor torque loss at high speed in favor of major loss reduction compared to line 905.

Figure 9H:
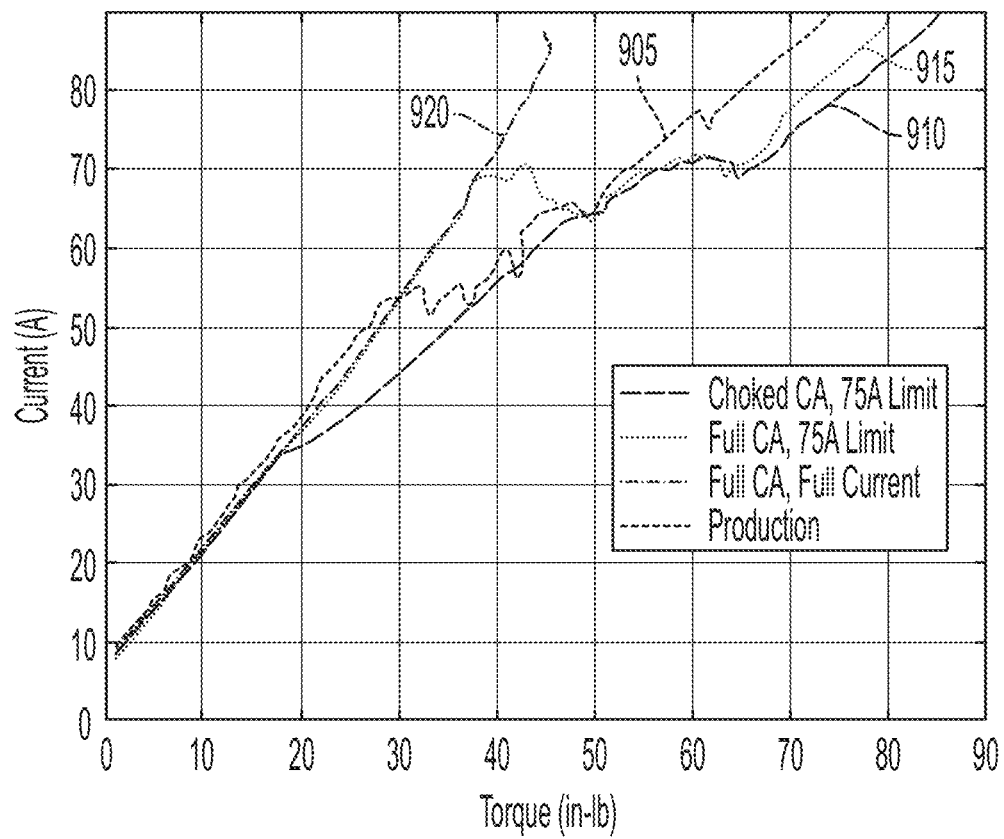

FIG. 9H is a graph 900H illustrating a relationship between torque of the motor 215 and current of the motor 215 for the low impedance battery pack. Specifically, the graph 900H illustrates an increase in current of the motor 215 as the torque of the motor 215 increases. Line 905 shows the relationship between torque and current during a normal operation of a conventional field weakening technique. Line 910 shows the relationship between torque and current while implementing current-based field weakening where the conduction angle is limited and the current is limited. Line 915 shows the relationship between torque and current while implementing current-based field weakening where the conduction angle is maximized and the current is limited. Line 920 shows the relationship between torque and current while implementing current-based field weakening where the conduction angle is maximized and the current is maximized. Lines 910 and 915 produce a greater bogdown torque as current increases and allows for a greater torque to be produced while completing an operation of the power tool 100.

Figure 9I:
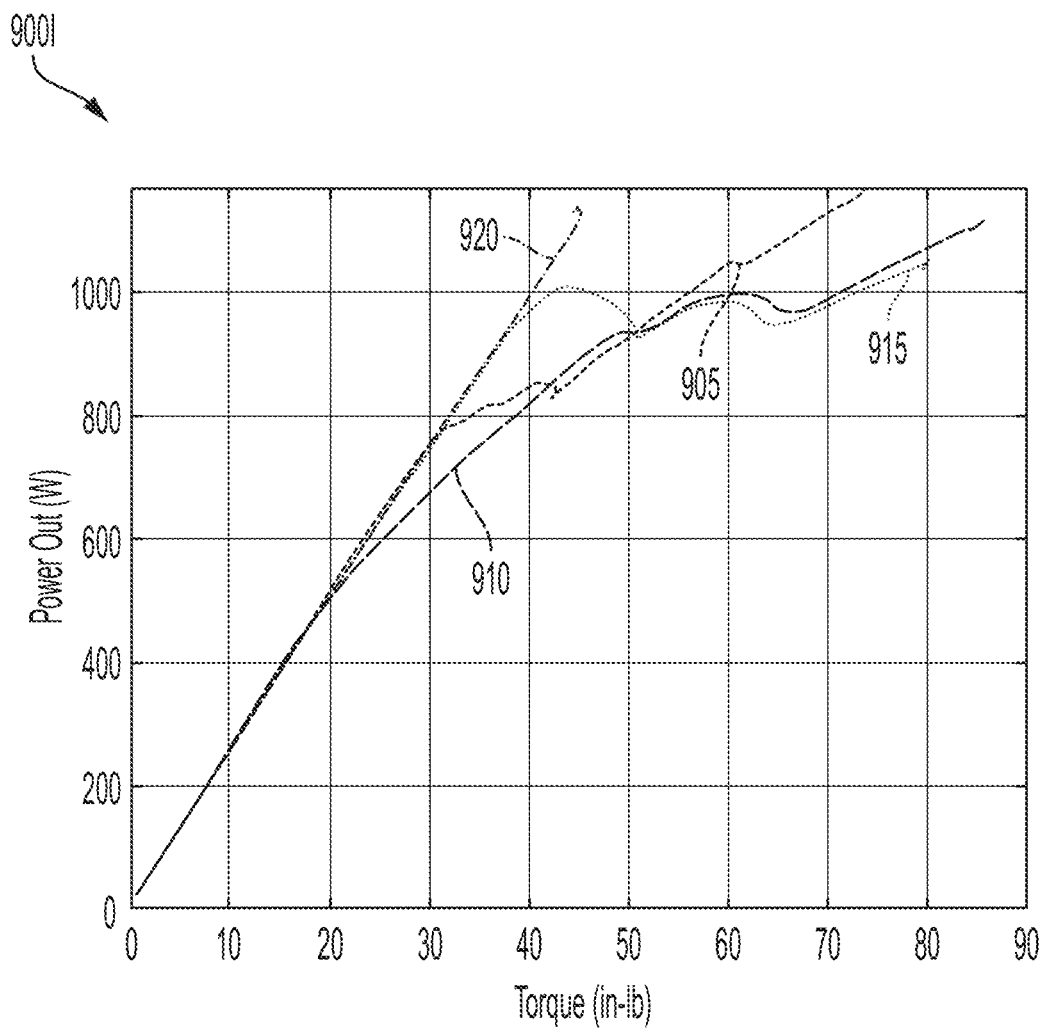

FIG. 9I is a graph 900I illustrating a relationship between torque of the motor 215 and output power of the motor 215 for the low impedance battery pack. Specifically, the graph 900I illustrates an increase in output power of the motor 215 as the torque of the motor increases. Line 905 shows the relationship between torque and output power during a normal operation of a conventional field weakening technique. Line 910 shows the relationship between torque and output power while implementing current-based field weakening where the conduction angle is limited and the current is limited. Line 915 shows the relationship between torque and output power while implementing current-based field weakening where the conduction angle is maximized and the current is limited. Line 920 shows the relationship between torque and output power while implementing current-based field weakening where the conduction angle is maximized and the current is maximized. When compared to the conventional field weakening of line 905, line 915 pulls more power in a mid-torque range while pulling similar losses. Line 910 pulls similar power in the mid-torque range while pulling up to 30% fewer thermal losses. In the high torque range, optimizing torque per amp is prioritized over maximum power, causing less power output of the tool as an intended consequence.

Figure 9J:
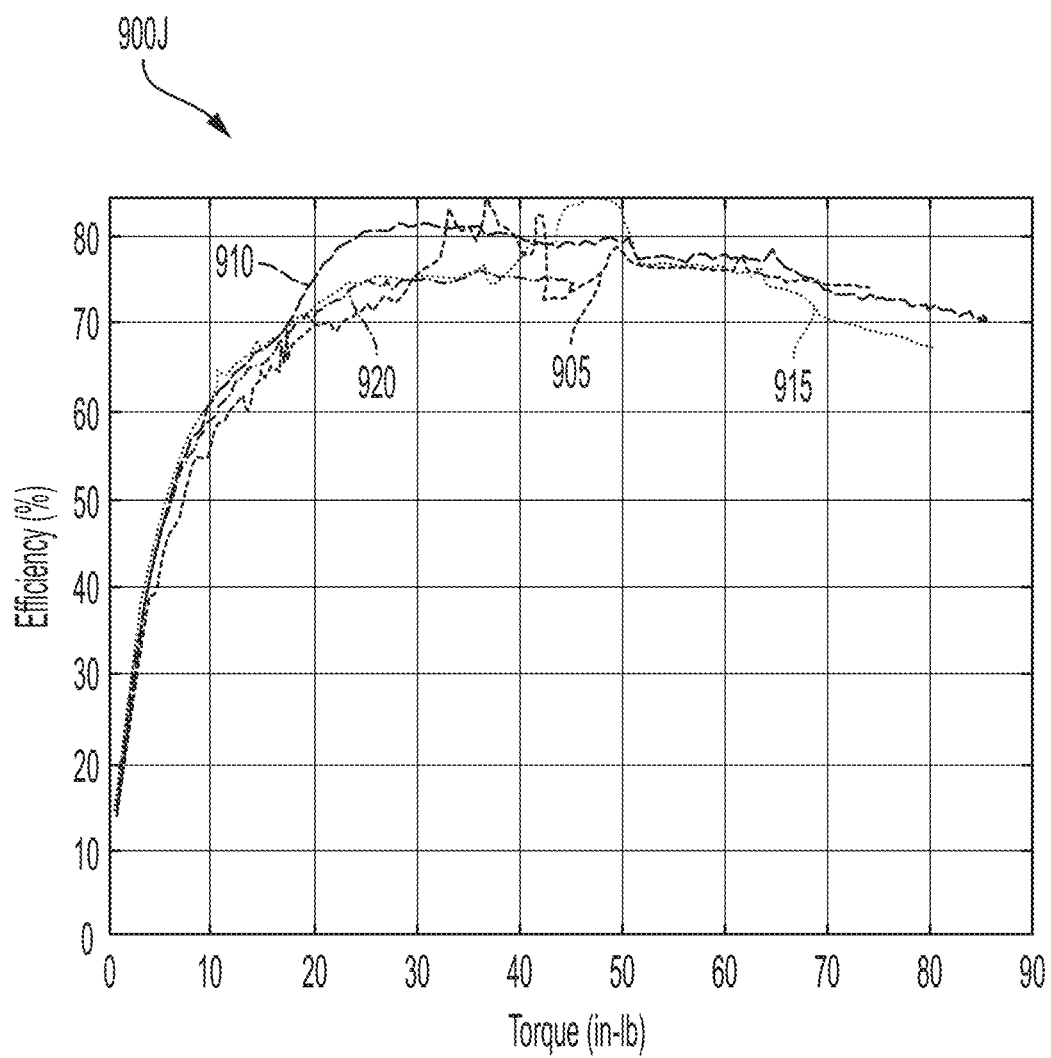

FIG. 9J is a graph 900J illustrating a relationship between torque of the motor 215 and efficiency of the motor 215 for the low impedance battery pack. Specifically, the graph 900J illustrates an increase in efficiency of the motor 215 as the torque of the motor increases. Line 905 shows the relationship between torque and efficiency during a normal operation of a conventional field weakening technique. Line 910 shows the relationship between torque and efficiency while implementing current-based field weakening where the conduction angle is limited and the current is limited. Line 915 shows the relationship between torque and efficiency while implementing current-based field weakening where the conduction angle is maximized and the current is limited. Line 920 shows the relationship between torque and efficiency while implementing current-based field weakening where the conduction angle is maximized and the current is maximized. Lines 910, 915, and 920 illustrate a similar increase in efficiency as the torque increases compared to the conventional field weakening of line 905, as torque continues to increase, the efficiencies shown by lines 910, 915, and 920 are greater than the efficiency of the conventional field weakening of line 905.

Figure 9K:
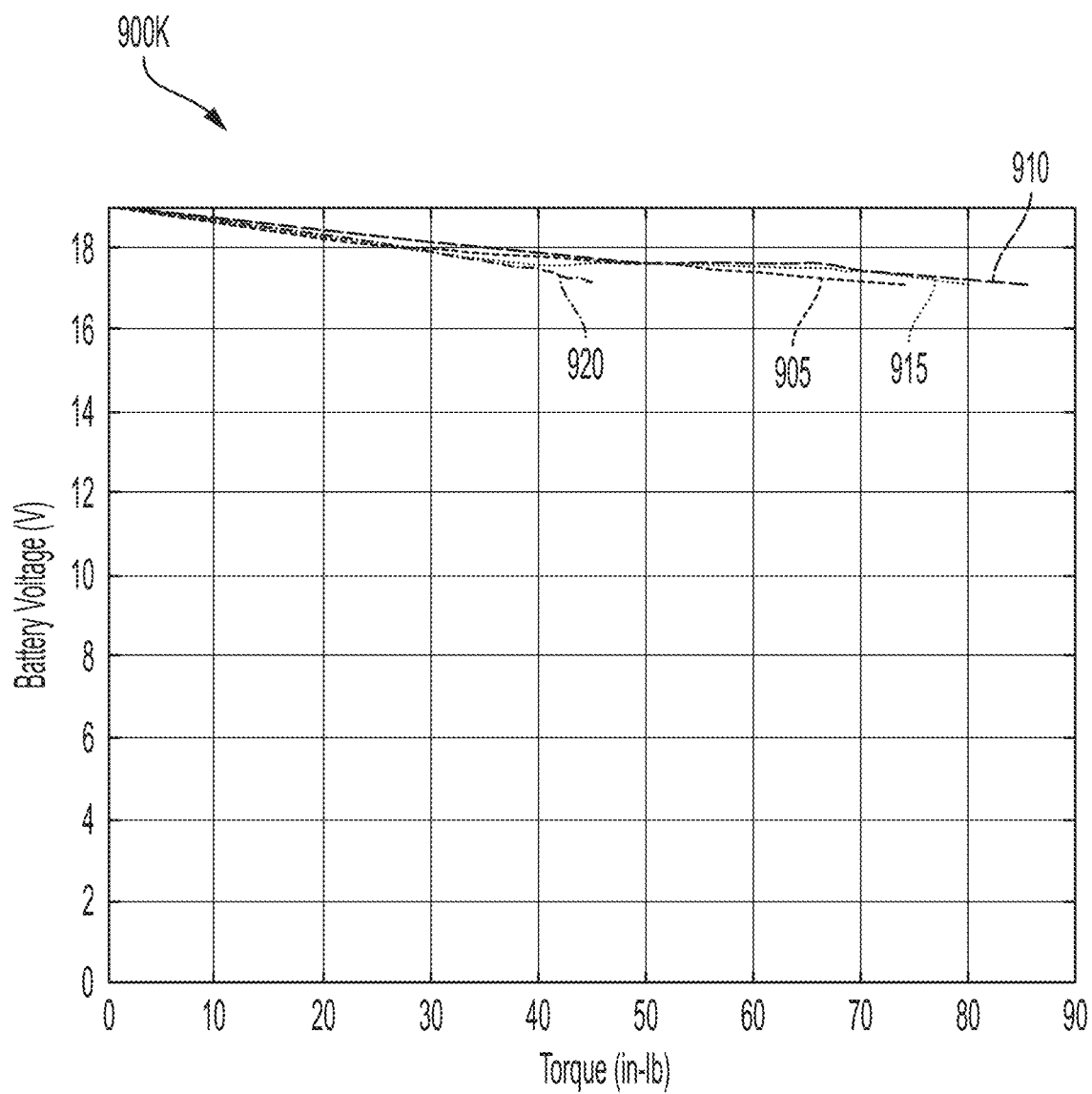

FIG. 9K is a graph 900K illustrating a relationship between torque of the motor 215 and battery pack voltage of the power source 205 for the low impedance battery pack. Specifically, the graph 900K illustrates a decrease in battery pack voltage as the torque of the motor increases. Line 905 shows the relationship between torque and battery pack voltage during a normal operation of a conventional field weakening technique. Line 910 shows the relationship between torque and battery pack voltage while implementing current-based field weakening where the conduction angle is limited and the current is limited. Line 915 shows the relationship between torque and battery pack voltage while implementing current-based field weakening where the conduction angle is maximized and the current is limited. Line 920 shows the relationship between torque and battery pack voltage while implementing current-based field weakening where the conduction angle is maximized and the current is maximized. Lines 910, 915, and 920 illustrate a similar rate of decrease in power source voltage as the torque increases for current-based field weakening compared to the conventional field weakening of line 905.

Figure 9L:
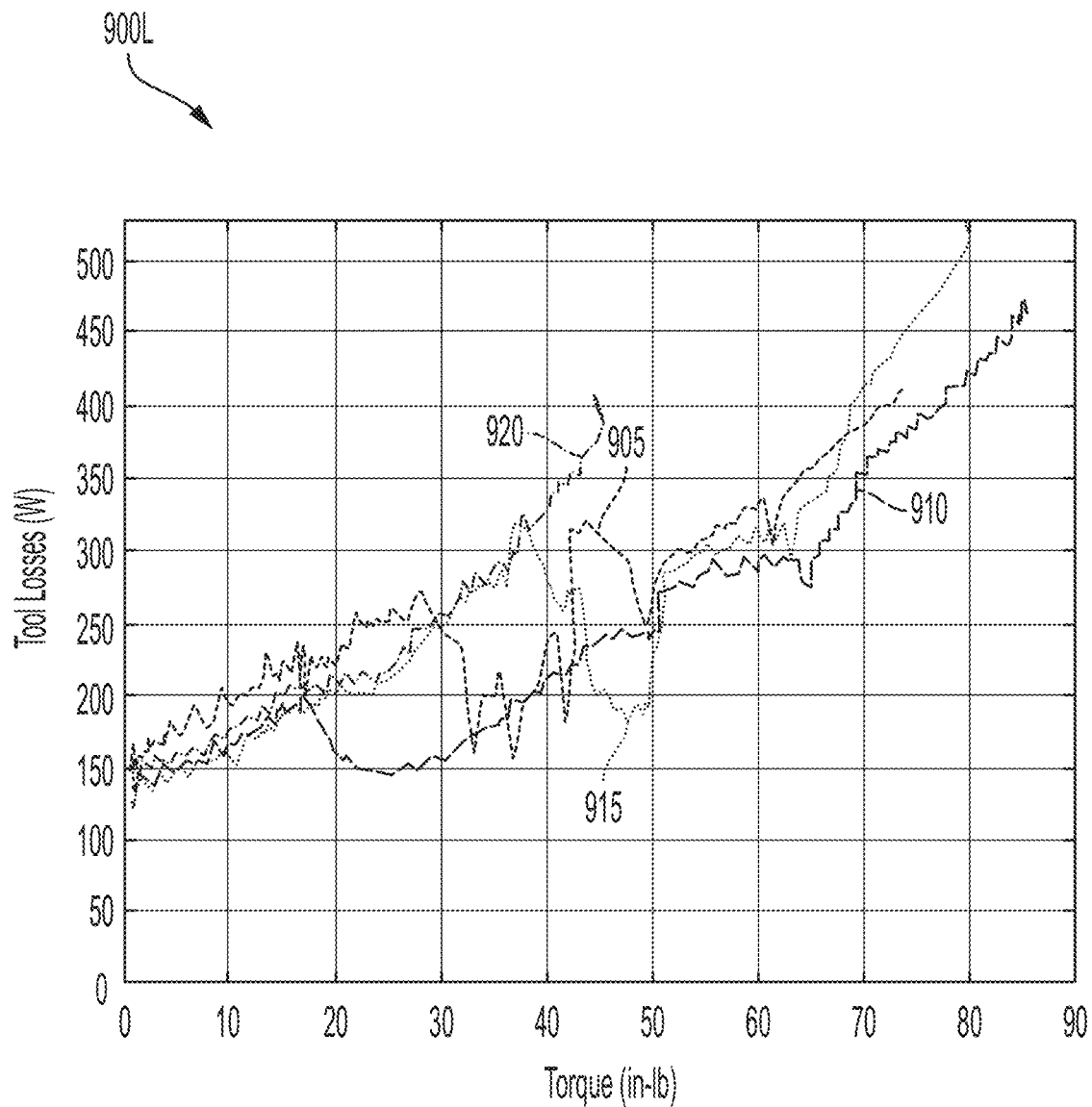

FIG. 9L is a graph 900L illustrating a relationship between torque of the motor 215 and power loss of the power tool 100 for the low impedance battery pack. Specifically, the graph 900L illustrates an overall increase in power loss as the torque of the motor increases. Line 905 shows the relationship between torque and power loss during a normal operation of a conventional field weakening technique. Line 910 shows the relationship between torque and power loss while implementing current-based field weakening where the conduction angle is limited and the current is limited. Line 915 shows the relationship between torque and power loss while implementing current-based field weakening where the conduction angle is maximized and the current is limited. Line 920 shows the relationship between torque and power loss while implementing current-based field weakening where the conduction angle is maximized and the current is maximized. Lines 910, 915, and 920 illustrate a lower initial power loss (e.g., 30W lower losses at low loads) as the torque increases compared to line 905. However, the current-based field weakening of lines 910, 915, and 920 produce similar power loss compared to line 905. More consistent tool losses regardless of the battery pack powering the power tool allows more power to be pulled out of the battery packs.

Figure 10:
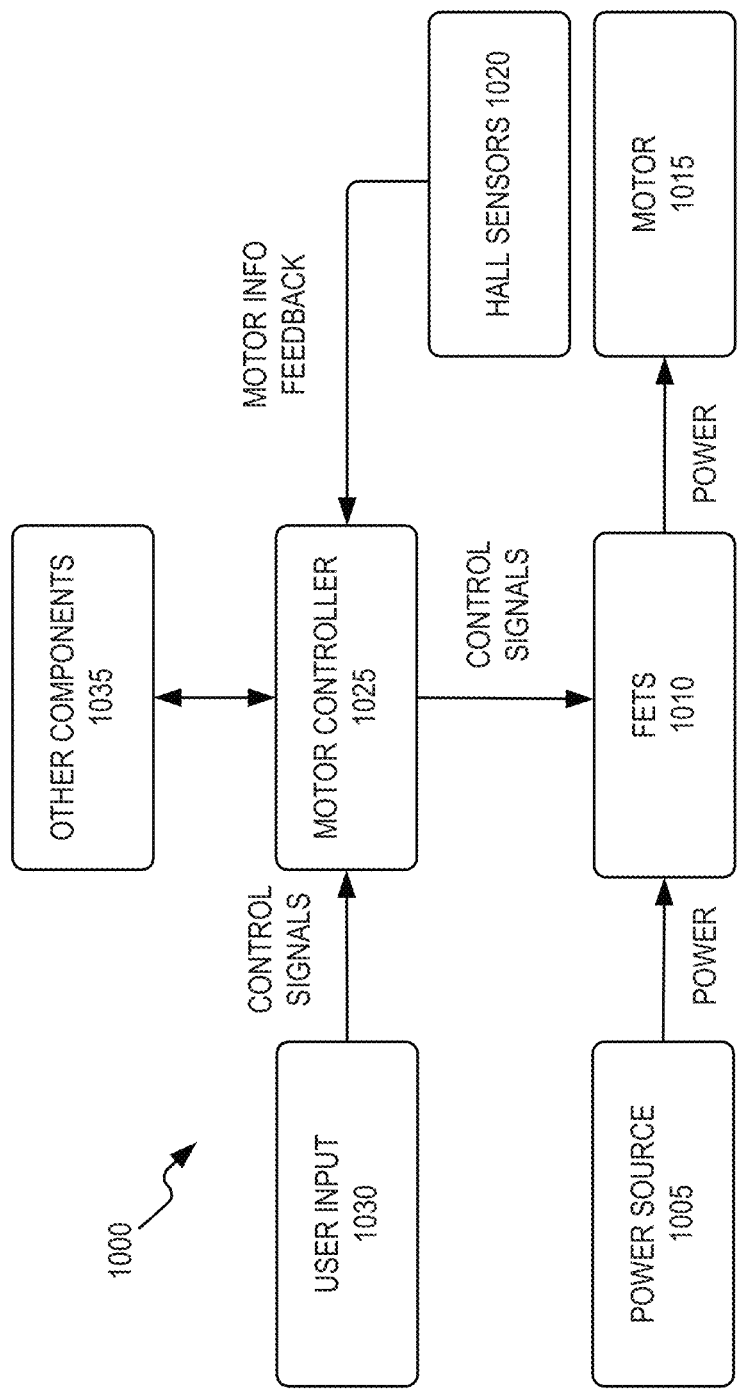
FIG. 10 illustrates a block diagram of a power tool including sensored motor control, such as in the power tool of FIG. 1.

FIG. 10 illustrates a simplified block diagram of an embodiment 1000 of the power tool 100 that implements sensored motor control for implementing the current-based field weakening of the method 800. The power tool 1000 includes a power source 1005, switches or Field Effect Transistors ("FETs") 1010, a motor 1015, Hall effect sensors 1020, a motor controller 1025 (e.g., controller 200), user input 1030, and other components 1035 (e.g., a battery pack fuel gauge, work lights [LEDs], current/voltage sensors, etc.). The power source 1005 provides DC power to the various components of the power tool 1000 and may be a power tool battery pack that is rechargeable and uses, for instance, lithium ion cell technology. In some instances, the power source 1005 may receive AC power (e.g., 120V/60 Hz) from a tool plug that is coupled to a standard wall outlet, and then filter, condition, and rectify the received power to output DC power. Each Hall effect sensor 1020 outputs motor feedback information, such as an indication (e.g., a pulse) when a magnet of the rotor rotates across the face of that Hall effect sensor 1020. Based on the motor feedback information from the Hall effect sensors 1020, the motor controller 1025 can determine the position, velocity, and/or acceleration of a rotor of the motor 1015. The motor controller 1025 also receives user controls from user input 1030, such as by depressing the trigger 125. In response to the motor feedback information and user controls, the motor controller 1025 transmits control signals to control the FETs 1010 to drive the motor 1015. By selectively enabling and disabling the FETs 1010, power from the power source 1005 is selectively applied to stator coils of the motor 1015 to cause rotation of the rotor. Although not shown, the motor controller 1025 and other components of the power tool 1000 are electrically coupled to the power source 1005 such that the power source 1005 provides power thereto.

Figure 11A:
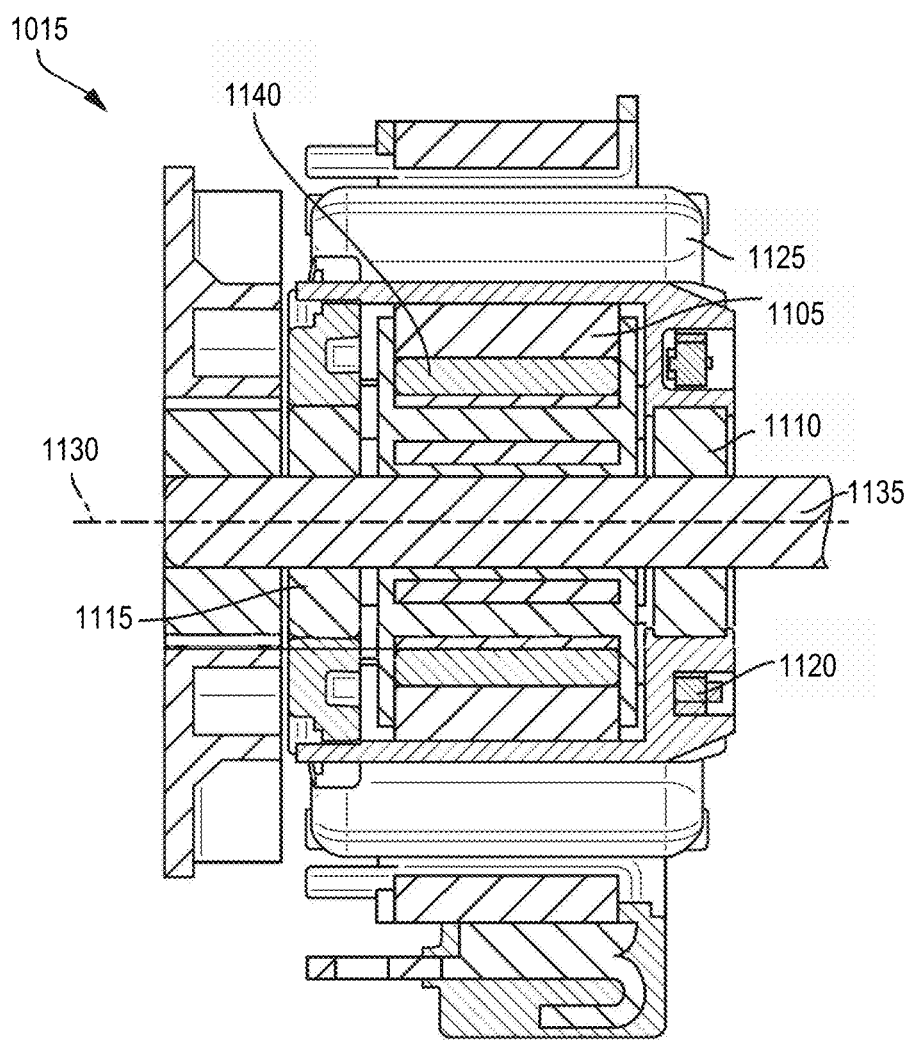
FIGS. 11A and 11B illustrate a sensor board of a brushless direct current motor incorporated in the power tool of FIG. 1.
Figure 11B:
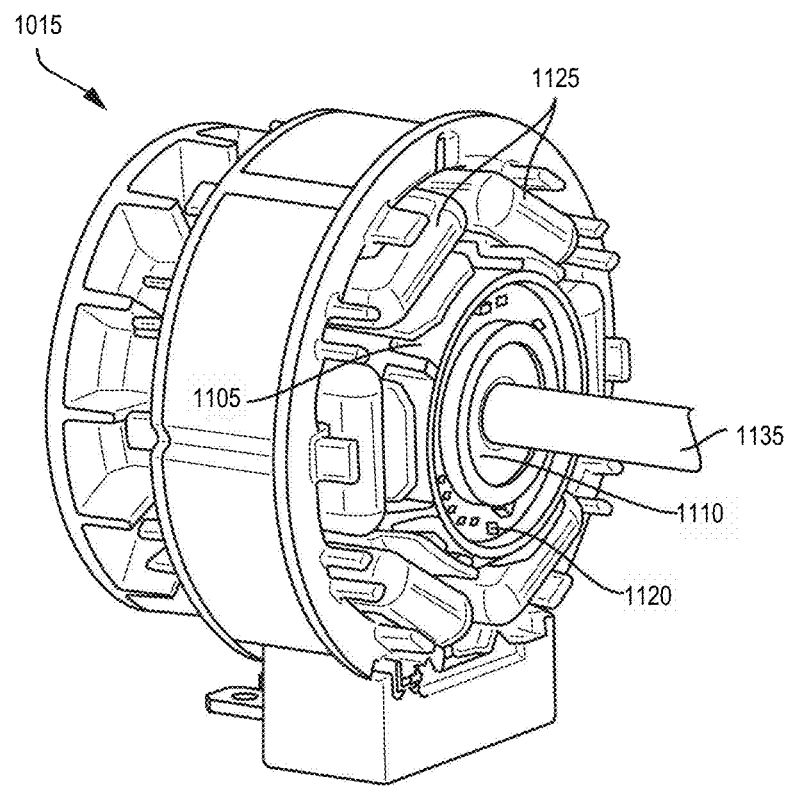

FIGS. 11A and 11B illustrate the motor 1015 in the power tool 1000. The motor 1015 includes a rotor 1105, a front bearing 1110, a rear bearing 1115 (collectively referred to as the bearings 1110, 1115), a position sensor board assembly 1120 within a stator envelope of the motor 1015, and a motor shaft 1135. Stator coils 1125 are parallel to the length of a rotor axis 1130. Rotor magnets 1140 are brought into proximity of the Hall effect sensors 1020 on the position sensor board assembly 1120 in order to detect the rotor position. Recessing the rotor 1105, the bearings 1110, 1115, and the position sensor board assembly 1120 within the stator envelope allows a more compact motor 1015 in the axial direction. In some embodiments, the power tool 1000 incudes a sensorless motor. In such embodiments, commutation is controlled without the use of the Hall effect sensors 1020. The position of the rotor 1130 may be determined by sensing a current of the sensorless motor via one or more current sensors 225 or by sensing a back-emf of the sensorless motor via a voltage sensor of the other components 235.

In some embodiments, the embodiment 1000, including the motor 1015 and motor controller 1025, executes the method 800 for implementing current-based field weakening. In some embodiments, the one or more current sensors 225 are included in the other components 1035. For example, the motor controller 1025 receives, via the one or more current sensors 225, a first signal indicative of the current of the motor 1015. The motor controller 1025 generates a current command 505 based on a characteristic of the motor 1015 during operation (e.g., an MTPA trajectory), such as in BLOCK 810. The motor controller 1025 sets a conduction angle of the motor 215 (e.g., a default conduction angle), via the motor controller 1025, based on the current command 505. The motor controller 1025 also supplies a PWM signal with a duty cycle to the motor 1015 to control the current (e.g. in order to achieve the current command 505), such as in BLOCK 820. The motor controller 1025 determines if the duty cycle of the PWM signal is equal to a first threshold (e.g., a 100% duty cycle), such as in BLOCK 825. If the duty cycle of the PWM signal is determined to be equal to the first threshold (e.g., a 100% duty cycle, a 95% duty cycle, a duty cycle less than 100%, etc.), the motor controller 1025 maintains the duty cycle at the first threshold, such as in BLOCK 830. For example, the motor controller 1025 transmits control signals to the FETs 1010 to both maintain the conduction angle (e.g., the default conduction angle) and to control the pulse-width modulated ("PWM") control signal with a duty cycle to increase the motor current up to the first threshold. In some embodiments, the first threshold is a duty cycle less than 100%. The motor controller 1025 also controls the conduction angle (e.g., a variable conduction angle between 90 degrees and 180 degrees) to the motor 1015 to control the motor current after the duty cycle of the PWM signal reaches and is maintained at the first threshold and to further increase the motor current, such as in BLOCK 835. The motor controller 1025 determines if the motor current is equal to a second threshold (e.g., a maximum motor current), such as in BLOCK 840. If the motor current is determined to be equal to the second threshold, the motor controller 1025 can then further control the conduction angle to maintain the motor current at the second threshold, such as in BLOCK 845. The motor controller 1025 also determines if the second conduction angle is equal to a third threshold (e.g., a maximum conduction angle, a conduction angle between 130° and 180°, etc.), such as in BLOCK 850. If the second conduction angle is determined to be equal to the third threshold, the motor controller 1025 maintains the conduction angle at the third threshold, such as in BLOCK 855.

Figure 12:
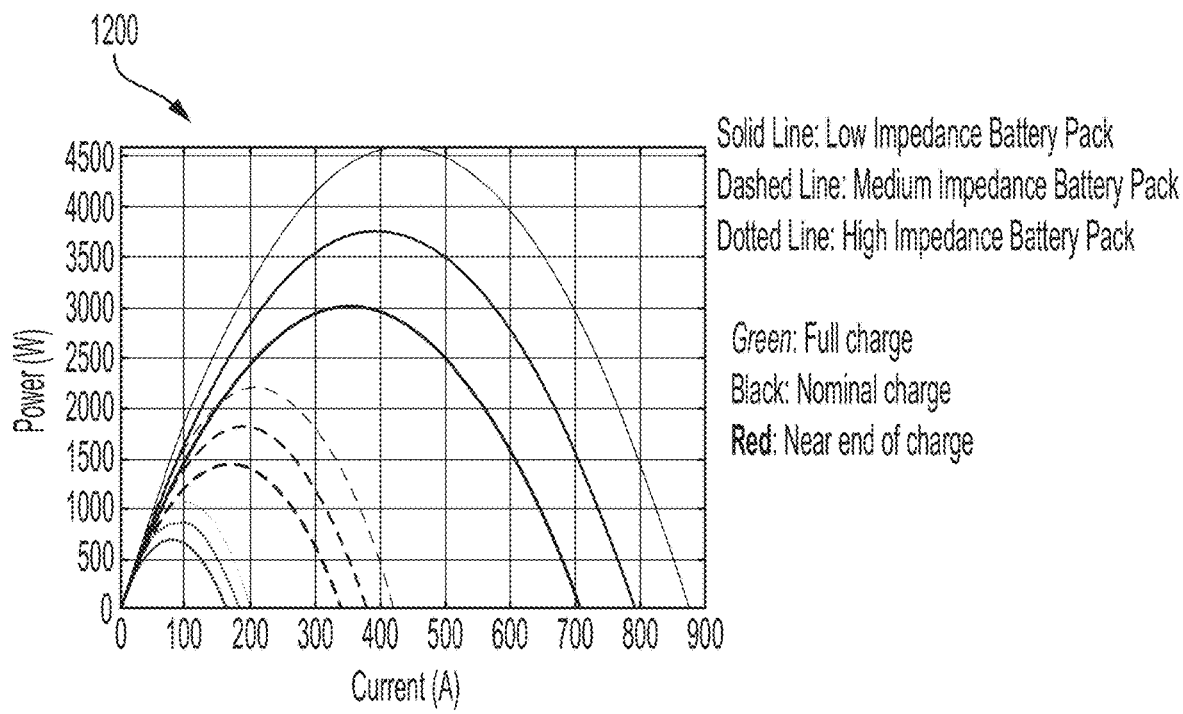
FIG. 12 illustrates a graph of a power versus current curve for a plurality of battery pack types at varying states of charge, in accordance with embodiments described herein.
Figure 13:
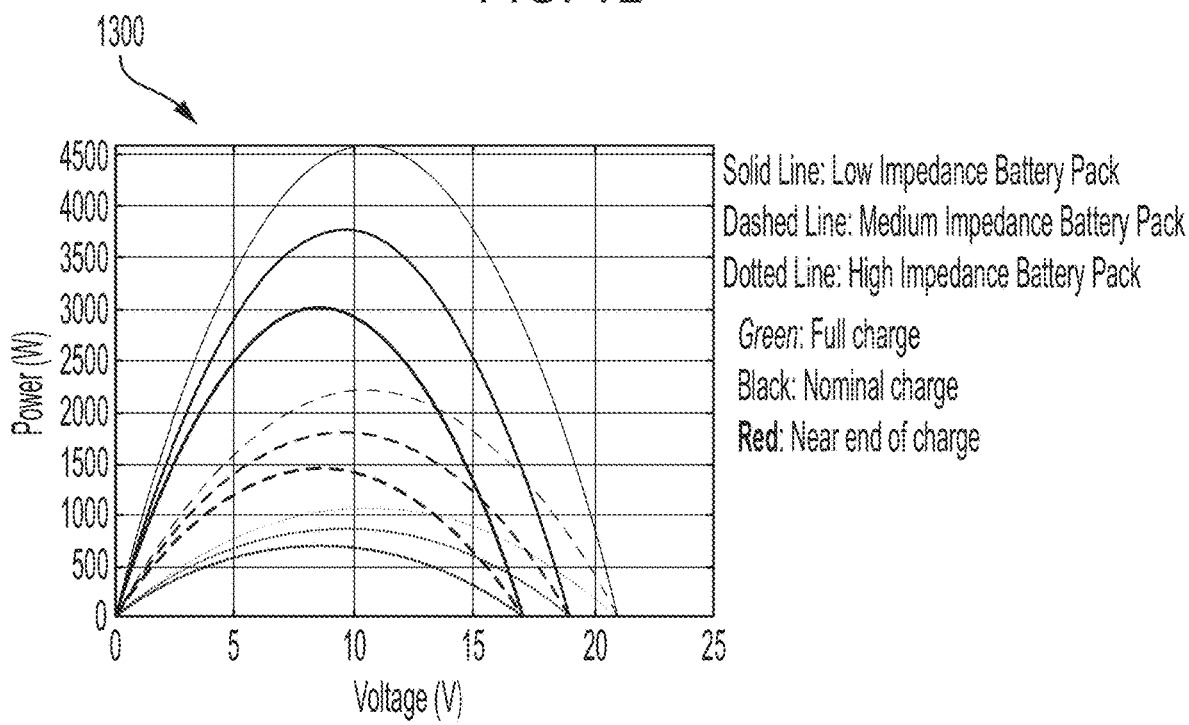
FIG. 13 illustrates a graph of a power versus voltage curve for a plurality of battery pack types at varying states of charge, in accordance with embodiments described herein.

Power supply to the motor 215 may depend on a type of the power source 205 (e.g., different battery pack types), a state of charge (e.g., charge capacity, charge voltage) of the power source 205, or a combination thereof. For example, FIG. 12 illustrates a graph 1200 providing a plurality of different battery pack types at different states of charge. In graph 1200, as each battery pack type decreases in the amount of remaining charge (e.g., from full charge to end of discharge), the current and power outputs both decrease. Additionally, FIG. 13 illustrates a graph 1300 providing the same plurality of different battery pack types at the same different states of charge. In graph 1300, as each battery pack type decreases in the amount of remaining charge, the voltage and power outputs both decrease.

Power tool systems often have a maximum current limit to limit current draw, and therefore limit power, provided to the motor 215. However, as current rises to meet this upper bound, the direct current internal resistance ("DCIR") losses of the battery pack increase and surpass a midpoint state of charge of the battery, resulting in suboptimum power provided by the battery pack. Embodiments described herein provide for dynamic current limiting based on a battery pack state of charge, operational losses, and current limits. Particularly, embodiments described herein set current limits to resemble current peaks seen in graph 1200 while considering voltage peaks found in graph 1300.

Figure 14:
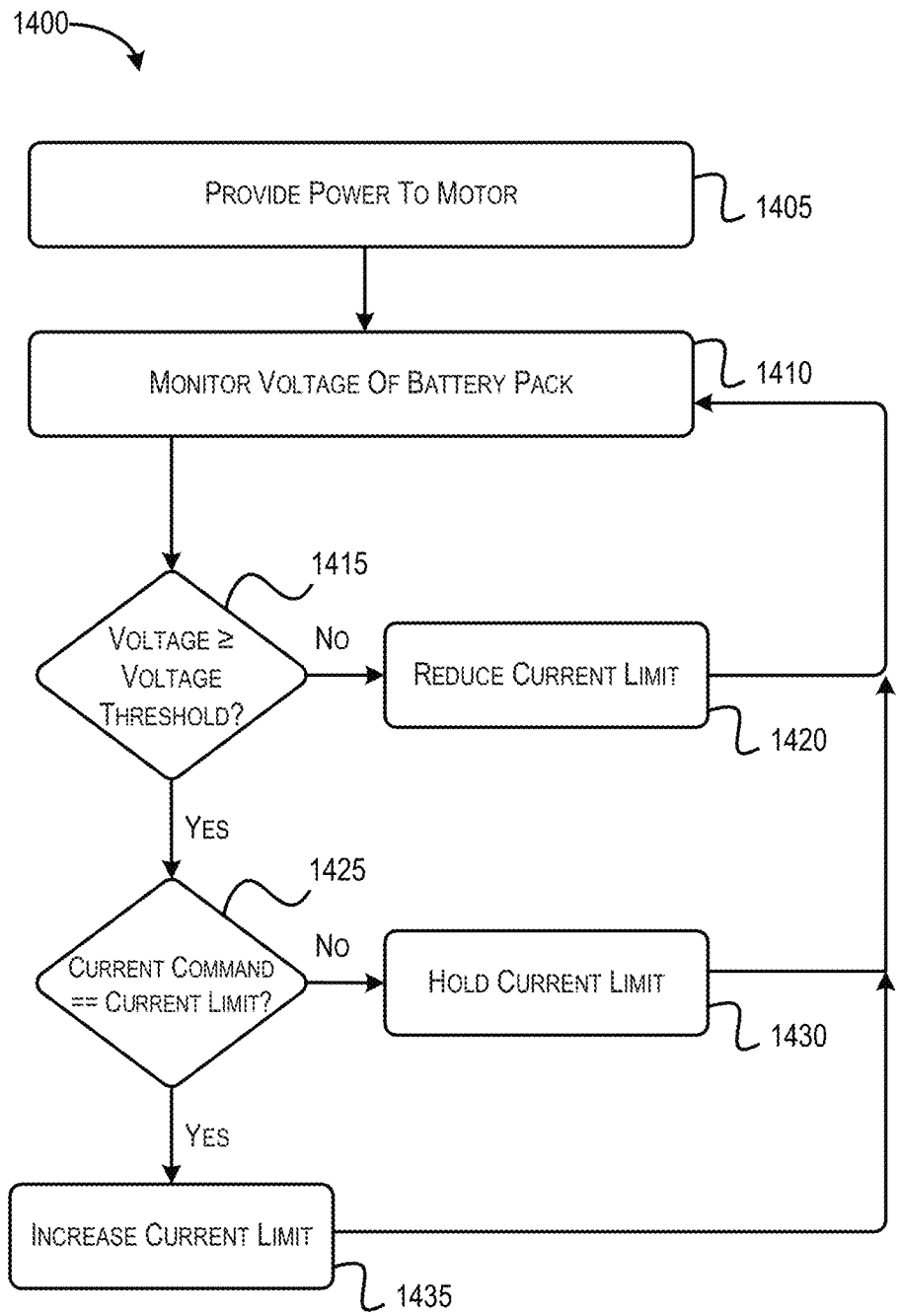
FIG. 14 illustrates a block diagram of another method performed by the controller of FIG. 2, in accordance with embodiments described herein.
Figure 15A:
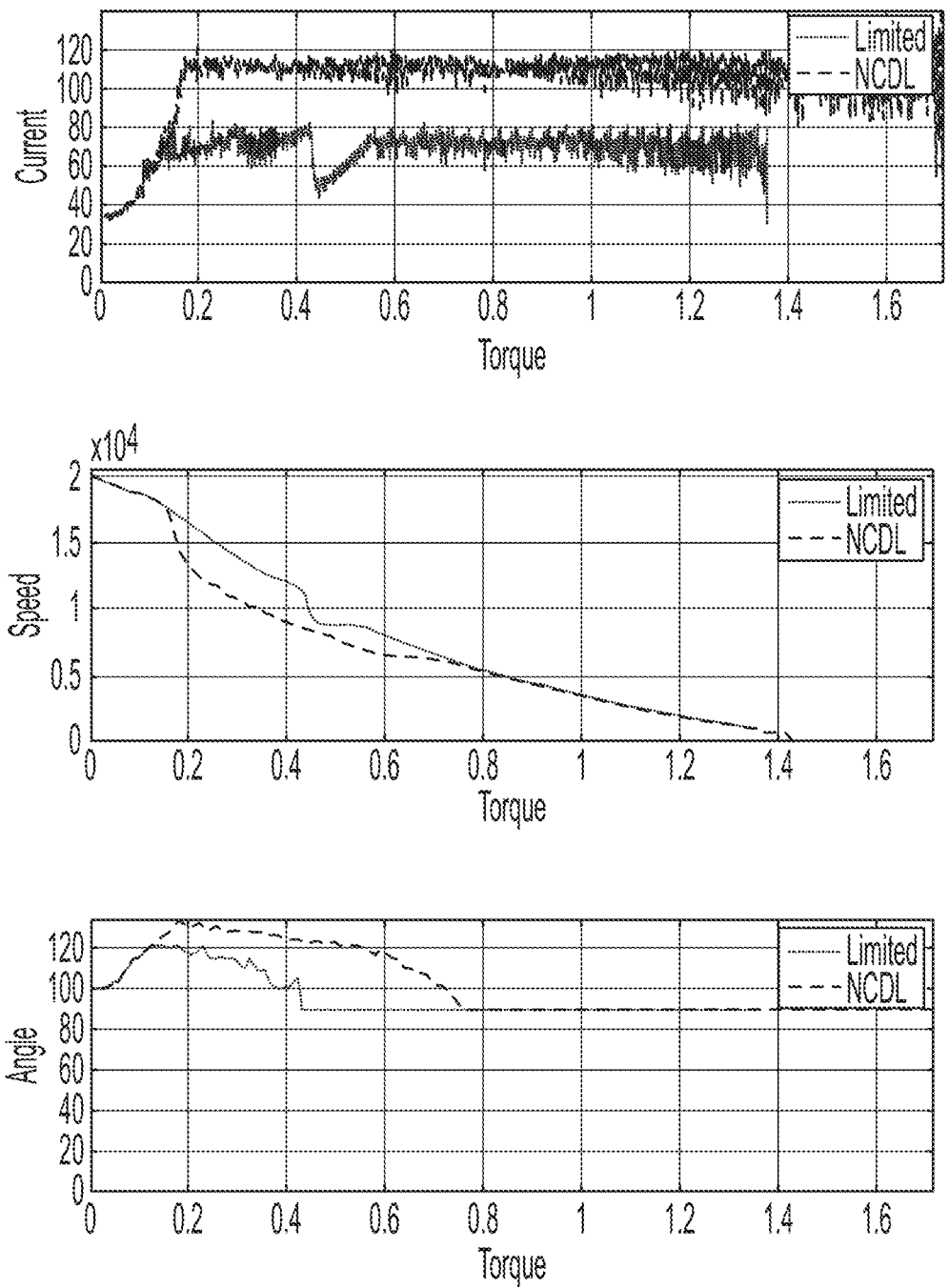
FIG. 15 illustrates diagrams of a plurality of characteristics of a first battery pack having a static current limit and a dynamic current limit.
Figure 15B:
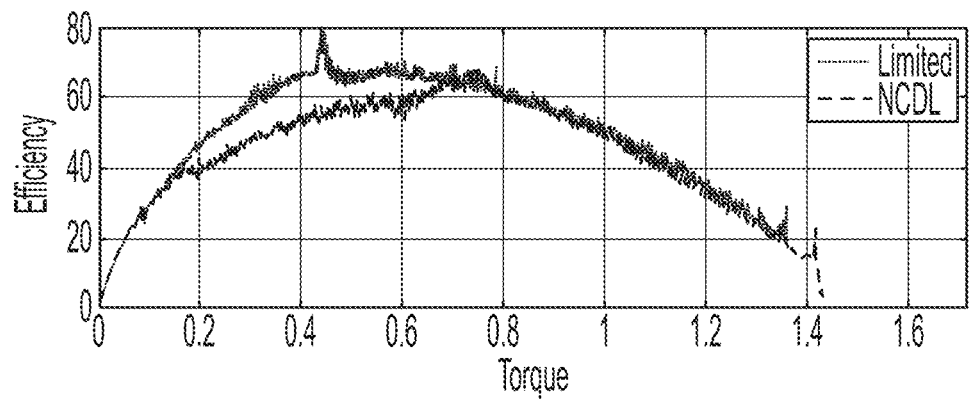
Figure 15B:
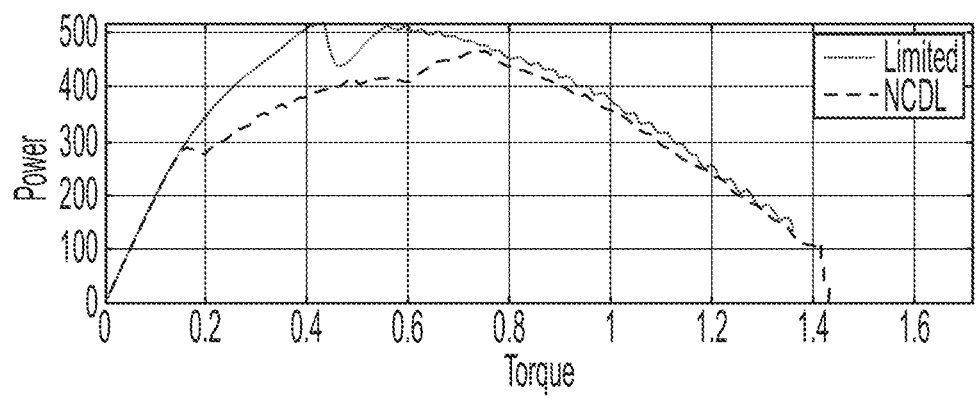
Figure 15B:
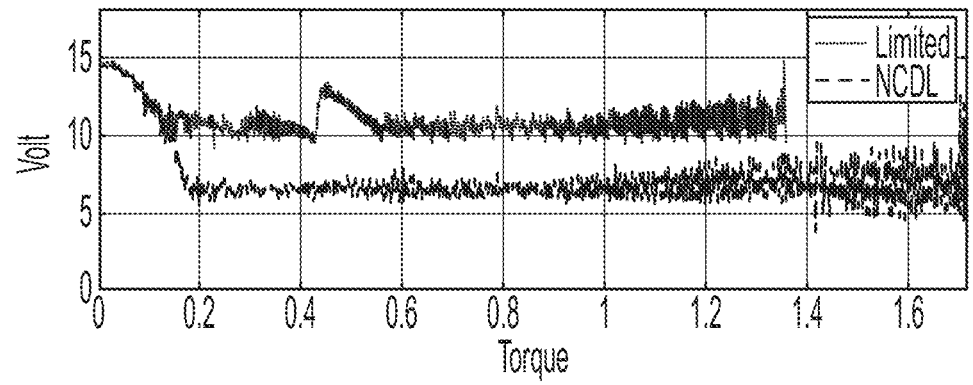

FIG. 14 provides a method 1400 for controlling a maximum current limit for the power tool 100. For example, with reference to FIG. 5, the maximum current limit is an upper limit on a value of the current command 505 provided by the controller 200. In another example, the maximum current limit is a value stored by the PI controller 510 and is a limit on the motor control signals 525 provided by the field weakening controller 520. In some embodiments, a maximum current limit is stored in the memory 260. The method 1400 may be performed by the controller 200.

At BLOCK 1405, the controller 200 provides power to the motor 215 according to a first current limit value. For example, in response to the trigger 125 being fully actuated, the controller 200 drives the motor 215 at a maximum speed associated with the motor current up to the maximum current limit. In some instances, the trigger 125 is only partially actuated. Accordingly, in such an instance, the controller 200 drives the motor 215 at a speed less than the maximum speed associated and with a motor current value less than the maximum current limit.

At BLOCK 1410, the controller 200 monitors a voltage of the power source 205 (e.g., a bus voltage). For example, a voltage sensor provides a voltage signal indicative of the voltage of the power source 205 to the controller 200. In some embodiments, the voltage sensor is included in the other components 235. At BLOCK 1415, the controller 200 determines whether the voltage of the power source 205 is greater than or equal to a voltage threshold. In some embodiments, the voltage threshold is set during an initialization stage of power tool operation. For example, upon starting operation of the motor 215, the controller 200 receives the voltage signal from the voltage sensor and multiples the voltage of the power source by a constant to set the voltage threshold.

When the voltage of the power source 205 is less than the voltage threshold, the controller 200 proceeds to BLOCK 1420 and reduces the maximum current limit (e.g., adjusts the maximum current limit to a second current limit value). For example, the maximum current limit may be reduced by a value dependent on DCIR, battery state of charge, tool load, battery health, etc. In some embodiments, after reducing the maximum current limit, the controller 200 returns to BLOCK 1410 and continues to monitor the voltage of the power source 205.

When the voltage of the power source 205 is greater than or equal to the voltage threshold, the controller 200 proceeds to BLOCK 1425 and determines whether the current command is equal to (or approaching) the maximum current limit. When the current command is not equal to (or approaching) the maximum current limit (e.g., below the maximum current limit), the controller 200 proceeds to BLOCK 1430 and holds (or maintains) the maximum current limit at its present value. In some embodiments, after maintaining the maximum current limit, the controller 200 returns to BLOCK 1410 and continues to monitor the voltage of the power source 205. When the current command is equal to (or approaching) the maximum current limit, the controller 200 proceeds to BLOCK 1435 and increases the maximum current limit (e.g., adjust the maximum current limit to a third current limit value). In some embodiments, the controller 200 applies an absolute maximum current limit that overrides the voltage control when multiple purposes for current limiting exist. For example, if the power tool 100 has a current limit of 100 Amperes and is connected to a low impedance power source, the motor current is sustained without the voltage of the power source 205 temporarily decreasing below the voltage threshold. If the power tool 100 is connected to a high impedance power source that cannot sustain the example current limit of 100 Amperes without the voltage temporarily decreasing below the voltage threshold, the controller 200 reduces the current limit to value lower than 100 Amperes (e.g., 70 Amperes) to maintain the optimum power source voltage. For example, the maximum current limit may be incrementally decreased until the target source voltage is at a threshold. In some embodiments, after increasing the maximum current limit, the controller 200 returns to BLOCK 1410 and continues to monitor the voltage of the power source 205.

While method 1400 is primarily described with respect to the voltage of the power source 205, in some embodiments, other characteristics of the power tool 100 and/or the power source 205 are monitored. For example, a bus voltage powering the motor 215 may be monitored at BLOCK 1410 and compared to a voltage threshold at BLOCK 1415. In another embodiment, a voltage of the motor 215 is monitored at BLOCK 1410 and compared to a voltage threshold at BLOCK 1415.

Figure 16B:
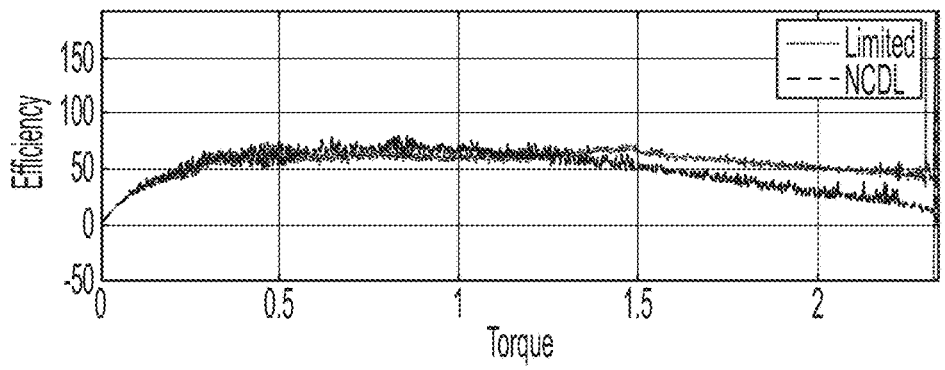
FIG. 16 illustrates diagrams of a plurality of characteristics of a second battery pack having a static current limit and a dynamic current limit.
Figure 16B:
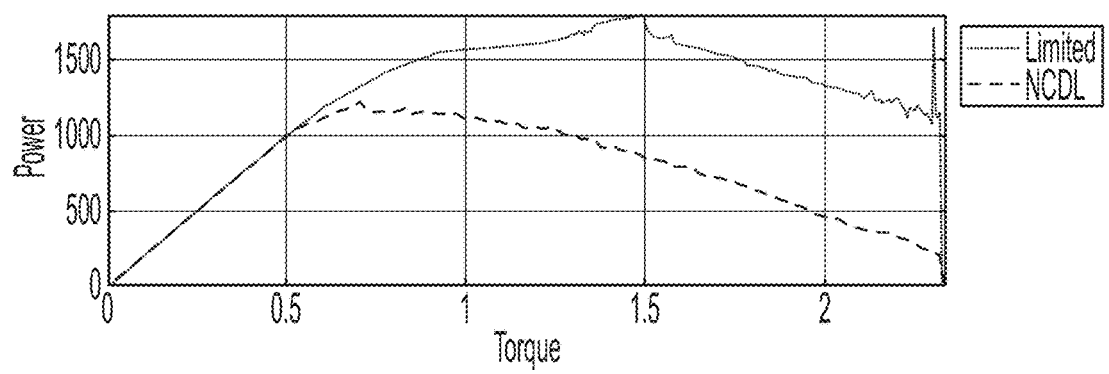
Figure 16B:
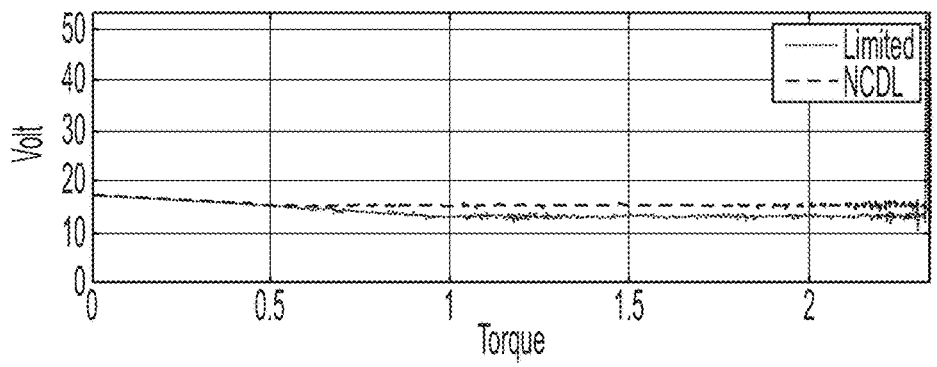

FIG. 15 illustrates measured characteristics of a power source 205 at a near end-of-charge state. The power source 205 is of a first battery pack type (e.g., a 1.5 Amp-hour battery pack). The measured characteristics are illustrated for both a static current limit, and a dynamic current limit provided by method 1400. As seen in FIG. 15, the dynamic current limit provides far more power to be generated while drawing less current. Similarly, FIG. 16 illustrates the same measured characteristics of a power source 205 of a second battery pack type (e.g., a 12 Amp-hour battery pack). The second battery pack type includes a lower DCIR value, allowing for a higher current draw compared without battery pack voltage collapse.

For power sources having high DCIR values, dynamic current limiting allows for lower current draw, prevents voltage collapse, and results in reduced thermal operation conditions, extended battery life, and higher output power compared to a static current limit. Additionally, for power sources having low DCIR values, dynamic current limiting allows for higher and more efficient output compared to a static current limit, allowing for more power to overcome greater load conditions.

Figures 17A, 17B:
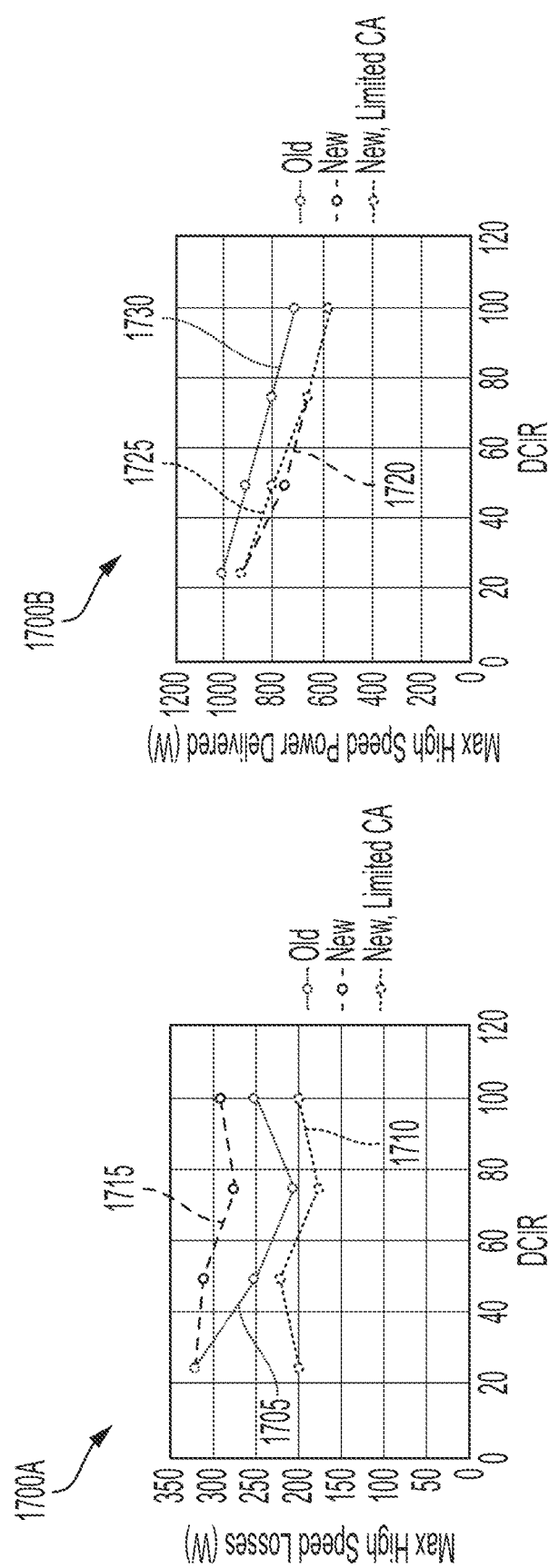
FIGS. 17A and 17B are graphs illustrating relationships between direct current internal resistance ("DCIR") of a battery pack and other parameters based on the current-based field weakening of FIGS. 8A and 8B, in accordance with embodiments described herein.

FIG. 17A is a graph 1700A illustrating a relationship between DCIR of a battery pack and maximum high speed power losses. Specifically, the graph 1700A illustrates similar peak tool power losses regardless of the attached battery pack when a power tool is operating at a high speed (e.g., 75% of the maximum power tool speed). Line 1705 shows the relationship between DCIR and maximum high speed power losses during a normal operation of a conventional field weakening technique. Line 1710 shows the relationship between DCIR and maximum high speed power losses while implementing current-based field weakening where the conduction angle is limited (e.g., to a maximum conduction angle). Line 1715 shows the relationship between DCIR and maximum high speed power losses while implementing the current-based field weakening described herein where the conduction angle is not limited.

FIG. 17B is a graph 1700B illustrating a relationship between DCIR of a battery pack and maximum high speed power delivered. Specifically, the graph 1700B illustrates a higher output power from the current-based field weakening regardless of the attached battery pack when a power tool is operating at a high speed (e.g., greater than 75% of the maximum power tool speed). Line 1720 shows the relationship between DCIR and maximum high speed power delivered during a normal operation of a conventional field weakening technique. Line 1725 shows the relationship between DCIR and maximum high speed power delivered while implementing current-based field weakening where the conduction angle is limited (e.g., to a maximum conduction angle). Line 1730 shows the relationship between DCIR and maximum high speed power delivered while implementing current-based field weakening where the conduction angle is not limited. Lines 1725 and 1730 show a greater output power while the power tool 100 operates at a high speed compared to the line 1720.

Figure 18B:
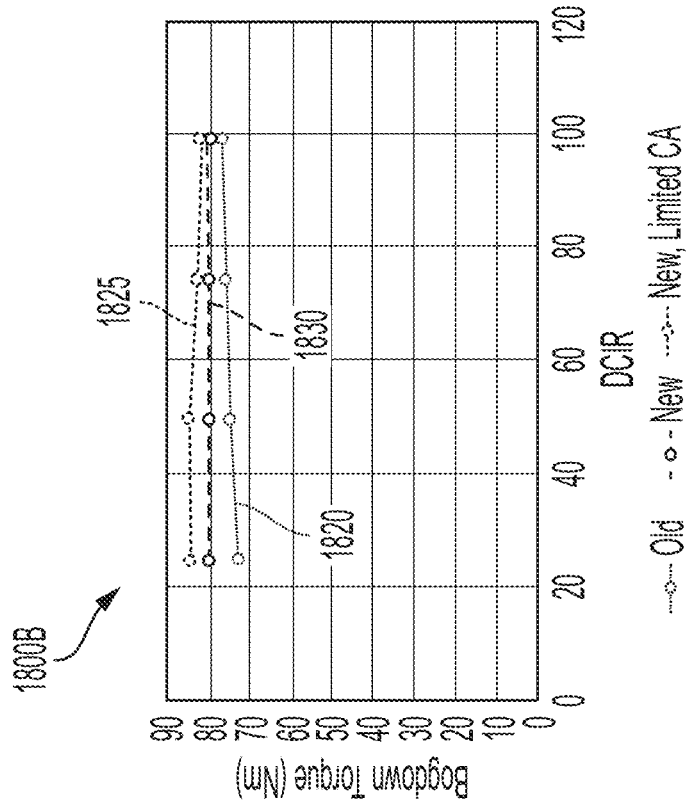
FIGS. 18A, 18B, and 18C are graphs illustrating relationships between DCIR of a battery pack and torque based on the current-based field weakening of FIGS. 8A and 8B, in accordance with embodiments described herein.
Figure 18A:
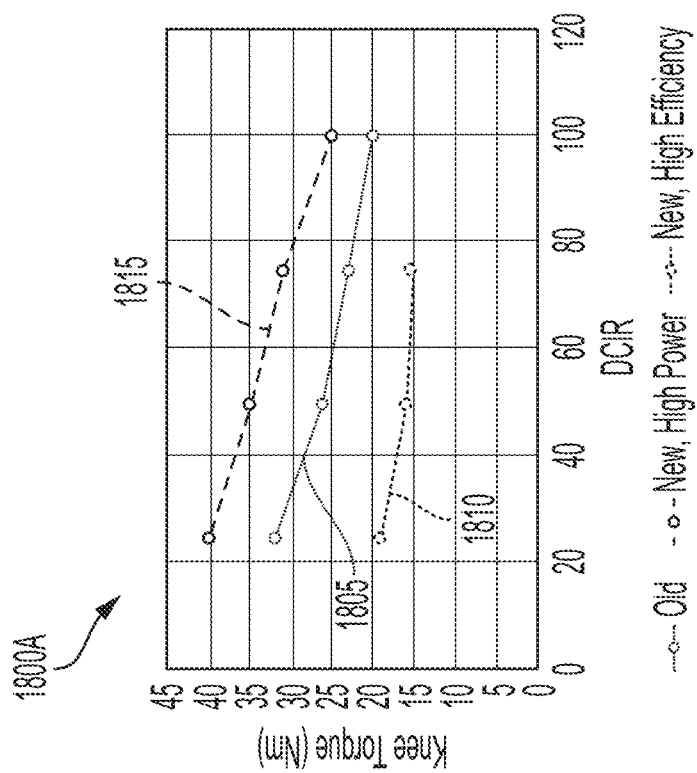

FIG. 18A is a graph 1800A illustrating a relationship between DCIR of a battery pack and knee torque. Specifically, the graph 1800A illustrates a decrease in knee torque as the DCIR increases. Line 1805 shows the relationship between DCIR and knee torque during a normal operation of a conventional field weakening technique. Line 1810 shows the relationship between DCIR and knee torque while implementing current-based field weakening where the conduction angle is limited (e.g., to a maximum conduction angle). Line 1815 shows the relationship between DCIR and knee torque while implementing current-based field weakening where the conduction angle is not limited. Line 1815 shows the highest torque sustained as the DCIR increases without reducing speed.

FIG. 18B is a graph 1800B illustrating a relationship between DCIR of a battery pack and bogdown torque (e.g., the torque produced by the motor 215 when the motor 215 is loaded beyond its capability to produce rotation, the torque produced at a high current where the power tool prioritizes maximizing torque over maximizing speed, etc.). Specifically, the graph 1800B illustrates a similar bogdown torque during a torque-speed curve as the DCIR increases. Line 1820 shows the relationship between DCIR and bogdown torque during a normal operation of a conventional field weakening technique. Line 1825 shows the relationship between DCIR and bogdown torque while implementing current-based field weakening with a limited conduction angle (e.g., to a maximum conduction angle). Line 1830 shows the relationship between DCIR and bogdown torque while implementing the current-based field weakening described herein while the conduction angle is not limited.

Figure 18C:
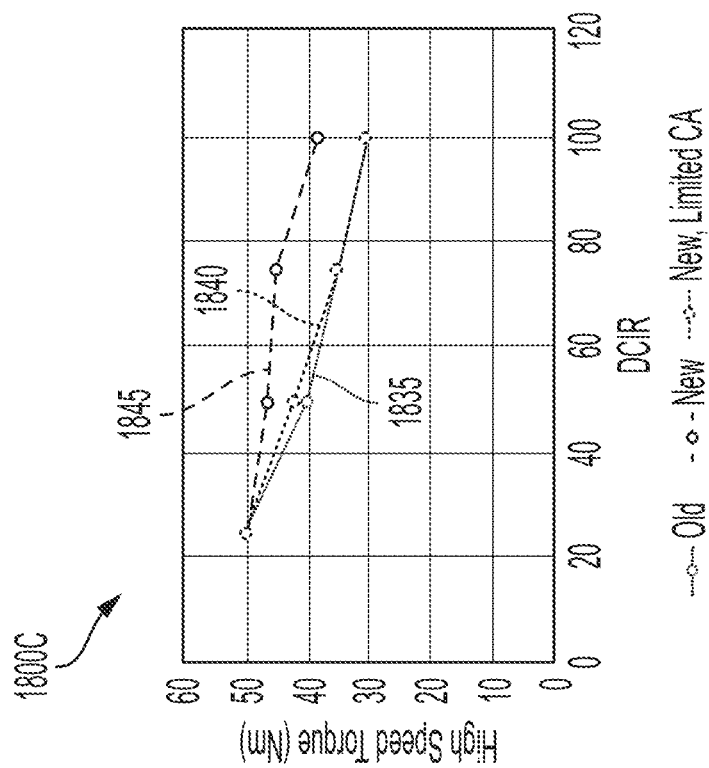

FIG. 18C is a graph 1800C illustrating a relationship between DCIR of a battery pack and high speed torque. Specifically, the graph 1800C illustrates a decrease in high speed torque during a torque-speed curve as the DCIR increases as the power tool 100 operates at a high speed (i.e., greater than 75% of the maximum speed). Line 1835 shows the relationship between DCIR and high speed torque during a normal operation of a conventional field weakening technique. Line 1840 shows the relationship between DCIR and high speed torque while implementing current-based field weakening with a limited conduction angle. Line 1845 shows the relationship between DCIR and high speed torque while implementing the current-based field weakening described herein while the conduction angle is not limited. Line 1845 shows the highest torque sustained as the DCIR increases at the highest speed.

Thus, embodiments described herein provide systems and methods for implementing a field weakening algorithm in a power tool. Various features and advantages are set forth in the following claims.

What is claimed is:

1. A power tool comprising:
   a housing;
   a brushless direct current (DC) motor within the housing;
   a power switching circuit that provides a supply of power from a battery pack to the brushless DC motor;
   a current sensor configured to sense a current of the brushless DC motor; and
   an electronic controller configured to:
   receive, via the current sensor, a first signal indicative of the current of the brushless DC motor,
   generate a current command based on a characteristic of the brushless DC motor,
   set a conduction angle of the brushless DC motor based on the current command,
   supply a pulse-width modulated ("PWM") signal having a duty cycle to the brushless DC motor to control the current of the brushless DC motor,
   determine whether the duty cycle of the PWM signal is equal to a first threshold,
   maintain, in response to the duty cycle being equal to the first threshold, the duty cycle at the first threshold,
   modify the conduction angle to increase the current of the brushless DC motor,
   determine whether the current command is equal to a second threshold, and
   control, in response to the current command being equal to the second threshold, the conduction angle to maintain the current command at the second threshold.

2. The power tool of claim 1, wherein the electronic controller is further configured to:
   determine whether the conduction angle is equal to a third threshold;
   maintain, in response to the conduction angle being equal to the third threshold, the conduction angle at the third threshold;
   determine whether the conduction angle is equal to a fourth threshold; and
   supply, in response to the conduction angle being equal to the fourth threshold, a second PWM signal having a second duty cycle to the brushless DC motor to control the current of the brushless DC motor.

3. The power tool of claim 1, wherein the first threshold is a 100% duty cycle of the PWM signal.

4. The power tool of claim 3, where, to maintain the duty cycle at the first threshold, the electronic controller is further configured to:
   control the PWM signal to stay at the 100% duty cycle.

5. The power tool of claim 1, wherein the second threshold is a maximum current command.

6. The power tool of claim 1, wherein the electronic controller is further configured to:
   receive, from the current sensor, a current feedback signal; and
   determine, based on the current feedback signal, a first variation in the PWM signal to apply to the brushless DC motor.

7. The power tool of claim 6, wherein the electronic controller is further configured to:
   determine, based on the current feedback signal, a second variation in the conduction angle to apply to the brushless DC motor.

8. A method of controlling a power tool including an electronic controller, the method comprising:
   receiving, via a current sensor, a first signal indicative of a current of a brushless DC motor;
   generating a current command based on a characteristic of the brushless DC motor;
   setting a conduction angle of the brushless DC motor based on the current command;
   supplying a pulse-width modulated ("PWM") signal having a duty cycle to the brushless DC motor to control the current of the brushless DC motor;
   determining whether the duty cycle of the PWM signal is equal to a first threshold;
   maintaining, in response to the duty cycle being equal to the first threshold, the duty cycle at the first threshold;
   modifying the conduction angle to increase the current of the brushless DC motor;
   determining whether the current command is equal to a second threshold; and
   controlling, in response to the current command being equal to the second threshold, the conduction angle to maintain the current command at the second threshold.

9. The method of claim 8, further comprising:
   determining whether the conduction angle is equal to a third threshold;
   maintaining, in response to the conduction angle being equal to the third threshold, the conduction angle at the third threshold;

determining whether the conduction angle is equal to a fourth threshold; and supplying, in response to the conduction angle being equal to the fourth threshold, a second PWM signal having a second duty cycle to the brushless DC motor to control the current of the brushless DC motor.

10. The method of claim 8, wherein the first threshold is a 100% duty cycle of the PWM signal.

11. The method of claim 10, wherein maintaining the duty cycle at the first threshold includes:
controlling the PWM signal to stay at the 100% duty cycle.

12. The method of claim 8, wherein the second threshold is a maximum current command.

13. The method of claim 8, further comprising:
receiving, from the current sensor, a current feedback signal; and
determining, based on the current feedback signal, a first variation in the PWM signal to apply to the brushless DC motor.

14. The method of claim 13, further comprising:
determining, based on the current feedback signal, a second variation in the conduction angle to apply to the brushless DC motor.

15. A power tool comprising:
a housing;
a brushless direct current (DC) motor within the housing;
a trigger;
a power switching circuit that provides a supply of power from a battery pack to the brushless DC motor;
a voltage sensor configured to sense a bus voltage;
a current sensor configured to sense a current of the brushless DC motor; and
an electronic controller connected to the trigger, the brushless DC motor, the voltage sensor, and the current sensor, the electronic controller configured to:
provide, in response to actuation of the trigger, power to the brushless DC motor according to a first current limit value,
receive, via the current sensor, a first signal indicative of the current of the brushless DC motor,
receive, via the voltage sensor, a second signal indicative of a voltage of the power switching circuit,
generate a current command based on a characteristic of the brushless DC motor,
set a conduction angle of the brushless DC motor based on the current command,
supply a pulse-width modulated ("PWM") signal having a duty cycle to the brushless DC motor to control the current of the brushless DC motor,
determine whether the voltage of the power switching circuit is greater than or equal to a voltage threshold,
determine whether the duty cycle of the PWM signal is equal to a first threshold,
adjust, in response to the voltage of the power switching circuit being less than or equal to the voltage threshold, the first current limit value to a second current limit value,
maintain, in response to the duty cycle being equal to the first threshold, the duty cycle at the first threshold,
modify the conduction angle to increase the current of the brushless DC motor,
determine whether the current command is equal to a second threshold, and
control, in response to the current command being equal to the second threshold, the conduction angle to maintain the current at the second threshold.

16. The power tool of claim 15, wherein the first current limit value is a permitted maximum current draw from the power switching circuit.

17. The power tool of claim 15, wherein the second current limit value is less than the first current limit value.

18. The power tool of claim 15, wherein the electronic controller is further configured to:
determine a speed of the brushless DC motor,
determine, based on the speed of the brushless DC motor and a speed command signal, an electric current value to provide to the brushless DC motor, and
provide the electric current value to drive the brushless DC motor.

19. The power tool of claim 18, wherein the electronic controller is further configured to:
determine, in response to the voltage of the power switching circuit being greater than the voltage threshold, whether the electric current value is equal to the first current limit value, and
adjust, in response to the electric current value not being equal to the first current limit value, the first current limit value to a third current limit value.

20. The power tool of claim 19, wherein the third current limit value is greater than the second current limit value.

* * * * *